(12) United States Patent
Nishimura et al.

(10) Patent No.: US 9,176,258 B2
(45) Date of Patent: Nov. 3, 2015

(54) OPTICAL LAMINATE

(75) Inventors: Naoya Nishimura, Kanagawa (JP); Hiroyuki Yoneyama, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 649 days.

(21) Appl. No.: 12/805,441

(22) Filed: Jul. 30, 2010

(65) Prior Publication Data
US 2011/0026116 A1 Feb. 3, 2011

(30) Foreign Application Priority Data
Jul. 31, 2009 (JP) .................. 2009-180219

(51) Int. Cl.
*G02B 5/02* (2006.01)
*B32B 27/18* (2006.01)
*B32B 5/16* (2006.01)
*G02B 5/30* (2006.01)
*G02B 1/10* (2015.01)
*G02B 6/42* (2006.01)

(52) U.S. Cl.
CPC .............. *G02B 1/105* (2013.01); *G02B 5/3033* (2013.01); *G02B 5/3041* (2013.01); *G02B 6/4275* (2013.01); *Y10T 428/249971* (2015.04); *Y10T 428/25* (2015.01); *Y10T 428/254* (2015.01)

(58) Field of Classification Search
None
See application file for complete search history.

(56) References Cited

U.S. PATENT DOCUMENTS

| 5,213,714 A | 5/1993 | Kampf et al. | |
|---|---|---|---|
| 6,225,040 B1 * | 5/2001 | Muys et al. | 430/533 |
| 2006/0182945 A1 * | 8/2006 | Yoneyama et al. | 428/304.4 |
| 2006/0216435 A1 * | 9/2006 | Nakamura | 428/1.1 |
| 2006/0221275 A1 * | 10/2006 | Matsufuji | 349/96 |
| 2007/0065660 A1 * | 3/2007 | Okamoto et al. | 428/328 |
| 2007/0086091 A1 * | 4/2007 | Sawanobori et al. | 359/582 |
| 2007/0247710 A1 * | 10/2007 | Nakashima et al. | 359/485 |
| 2008/0118669 A1 * | 5/2008 | Inoue et al. | 428/1.31 |
| 2009/0142562 A1 * | 6/2009 | Miyagawa et al. | 428/212 |
| 2009/0207492 A1 * | 8/2009 | Horio et al. | 359/507 |
| 2009/0280317 A1 * | 11/2009 | Nakashima et al. | 428/332 |
| 2011/0026121 A1 * | 2/2011 | Suzuki et al. | 359/585 |

FOREIGN PATENT DOCUMENTS

| EP | 0328981 | 2/1989 |
|---|---|---|
| JP | 2005-096397 | 4/2005 |
| JP | 2005-115216 A | 4/2005 |
| JP | 2005-196122 | 7/2005 |
| JP | 2005-316425 | 11/2005 |
| JP | 2007-185824 | 7/2007 |
| JP | 2007-293325 | 11/2007 |
| WO | WO 2007/142142 A1 | 12/2007 |
| WO | WO 2009/075201 A1 | 6/2009 |

OTHER PUBLICATIONS

Xing et al., The electronic structure of poly(3,4-ethylenedioxythiophene): studied by XPS and UPS, Synthetic Metals, vol. 89, Issue 3, Sep. 1997, pp. 161-165.*

* cited by examiner

*Primary Examiner* — Callie Shosho
*Assistant Examiner* — Patrick English
(74) *Attorney, Agent, or Firm* — Jean C. Edwards, Esq.; Edwards Neils PLLC

(57) ABSTRACT

An optical laminate includes a support and an antistatic layer formed from a composition containing the following (A) to (C) and having an average thickness of from 0.03 to 0.40 μm: (A) a hydrophobilized conductive polymer composition containing a π-conjugated system conductive polymer and an anion group-containing polymer dopant; (B) an inorganic particle having an average particle size of from 1 to 300 nm; and (C) an ionizing radiation curable compound.

20 Claims, No Drawings

OPTICAL LAMINATE

CROSS-REFERENCE TO RELATED APPLICATIONS

This application claims the benefit of Japanese Patent Application JP 2009-180219, filed Jul. 31, 2009, the entire content of which is hereby incorporated by reference, the same as if set forth at length.

FIELD OF THE INVENTION

The present invention relates to an optical laminate having an antistatic layer.

BACKGROUND OF THE INVENTION

In various image display devices such as a liquid crystal display device (LCD), a plasma display panel (PDP), an electroluminescent display (ELD) and a cathode ray tube display device (CRT), an optical laminate is disposed on the surface of the display for the purpose of imparting various functions. For that reason, the optical laminate is required to have high physical strengths (for example, scar resistance, etc.), transparency, chemical resistance, weather resistance (for example, resistance to moist heat, resistance to light, etc.) and the like. Also, in order to prevent the attachment of dusts (for example, motes, etc.) which are liable to lower the visibility onto the surface of the optical laminate from occurring, antistatic properties are also required.

In order to impart the antistatic properties, there is known an antireflection film containing a conductive metal oxide (see, for example, JP-A-2005-196122). In the case of using a metal oxide as the conductive material, it is necessary to increase a density of the metal oxide in a conductive layer (antistatic layer) for the purpose of bringing about conductivity. In that case, there is a concern that the transparency, hardness or durability is affected by an influence of excessive addition of the metal oxide.

On the other hand, there is known a laminate using a conductive polymer as the conductive material (see, for example, JP-A-2005-96397). However, in this laminate, a conductive layer was formed of the conductive polymer singly, and this was very inefficient from the standpoints of costs and manufacturing steps. For that reason, it was desired to add a conductive function to a layer having other function.

In the case where a conductive polymer is added in a layer to be provided on the outermost surface of an optical laminate (for example, a low-refractive index layer, a hard coat layer, etc.), or a conductive functional group is introduced into a binder constituting the layer, when the amount of the conductive material is increased until sufficient conductivity is obtained, curing of the binder is impaired, and the necessary physical strengths of the layer (for example, scar resistance, etc.) are lowered. Therefore, it was difficult to provide the layer to be provided on the outermost surface of the optical laminate with an antistatic function. Also, when the conductive polymer is used for a hard coat layer having a thickness of several μm, the use amount of a curable binder increases, and the necessary physical strength is easily obtainable. However, in order to ensure the contact between conductive materials necessary for revealing the conductivity, the use amount of the conductive material increases, and there were involved such problems as coloration and an increase of costs.

In the case of coating a volatile solvent-containing composition containing only a conductive polymer composition and an ionizing radiation curable compound as a binder to prepare a thin film of not more than 1 μm, the liquid viscosity is low so that surface properties of the coating film become non-uniform. In the case where a polymer is added as a thickener to such a composition until the resulting composition has a proper viscosity, the polymer and the conductive polymer composition cause phase separation, resulting in causing such problems as deterioration of surface properties and a lowering of the physical strength or conductivity.

JP-A-2007-185824, JP-A-2005-316425 and JP-A-2007-293325 disclose an embodiment in which an ion-conducting or electron-conducting conductive material is added in a low-refractive index layer.

However, the materials specifically disclosed in the working examples of JP-A-2007-185824, JP-A-2005-316425 and JP-A-2007-293325 are an ion-conducting material, and there was the case where the conductivity is not always sufficient depending upon the environmental moisture. Also, JP-A-2007-185824, JP-A-2005-316425 and JP-A-2007-293325 disclose organic conductive polymer compounds such as polyaniline and polythiophene, both of which are a conductive polymer, as illustrative compounds. However, in the case where such a compound is merely introduced into a coating film as it is, it does not substantially have conductivity and is required to be partially oxidized by doping.

However, when anion doping which is generally used is applied, since the resulting conductive polymer is high in hydrophilicity, it is low in affinity with a hydrophobic material, and it was difficult to form an antistatic layer with excellent surface properties using such a material. European Patent No. 328,981 discloses that an organic solvent-soluble thiophene derivative can be synthesized by electrolytic polymerization in an organic solvent system using a thiophene derivative and an organic solvent-soluble monomer dopant. However, though there is a tendency that this organic solvent-soluble polythiophene derivative is improved with respect to the affinity with a general-purpose curable monomer, it has become clear that when used for an antireflection film for a protective film of a polarizing plate, the monomer dopant elutes by an alkali treatment (saponification treatment), resulting in causing a problem that the conductivity is remarkably lowered.

SUMMARY OF THE INVENTION

An object of the invention is to solve the foregoing problems of the related art and to provide an optical laminate which is excellent in antistatic properties and scar resistance, favorable in surface properties and free from a lowering of antistatic ability to be caused due to a saponification treatment at the time of polarizing plate preparation. Furthermore, another object of the invention is to provide a polarizing plate using the subject optical laminate and an image display device using the subject laminate or the subject polarizing plate.

In order to solve the foregoing problems, the present inventors made extensive and intensive investigations. As a result, the foregoing problems have been solved by the following optical laminates. That is, the invention has been achieved by the following means.

1. An optical laminate comprising a support and an antistatic layer formed from a composition containing the following (A) to (C) and having an average thickness of from 0.03 to 0.40 μm:
   (A) a hydrophobilized conductive polymer composition containing a π-conjugated system conductive polymer and an anion group-containing polymer dopant;

(B) an inorganic fine particle having an average particle size of from 1 to 300 nm; and (C) an ionizing radiation curable compound.

2. The optical laminate as set forth above in 1, wherein the inorganic fine particle (B) is surface-treated with at least one of a hydrolyzate of an organosilane compound represented by the following formula (1) and a partial condensate of the hydrolyzate.

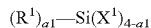   Formula (1)

In the foregoing formula, $R^1$ represents a substituted or unsubstituted alkyl group or a substituted or unsubstituted aryl group; $X^1$ represents a hydroxyl group or a hydrolyzable group; a1 represents an integer of from 1 to 3; and when plural $R^1$s or $X^1$s are present, each $R^1$ or $X^1$ may be the same as or different from every other $R^1$ or $X^1$.

3. An optical laminate comprising a support and an antistatic layer formed from a composition containing the following (A), (C) and (D) and having an average thickness of from 0.03 to 0.40 μm:

(A) a hydrophobilized conductive polymer composition containing a π-conjugated system conductive polymer and an anion group-containing polymer dopant;

(C) an ionizing radiation curable compound; and (D) an organic fine particle having an average particle size of from 1 to 300 nm.

4. The optical laminate as set forth above in any one of 1 to 3, wherein the conductive polymer composition (A) is soluble in an organic solvent having a relative dielectric constant of from 2 to 30 and a water content of not more than 5% by mass in a degree of at least 1.0% by mass.

5. The optical laminate as set forth above in any one of 1 to 4, wherein the π-conjugated system conductive polymer in (A) is polythiophene, polyaniline or a derivative thereof.

6. The optical laminate as set forth above in any one of 1, 2, 4 and 5, wherein the inorganic fine particle (B) contains an inorganic fine particle having an average particle size of from 40 to 300 nm.

7. The optical laminate as set forth above in 6, wherein the inorganic fine particle (B) further contains an inorganic fine particle having an average particle size of from 1 to 40 nm.

8. The optical laminate as set forth above in any one of 1, 2 and 4 to 7, wherein the inorganic fine particle (B) has pores in the inside thereof.

9. The optical laminate as set forth above in any one of 1 to 8, wherein the ionizing radiation curable compound (C) has a polymerizable unsaturated group.

10. The optical laminate as set forth above in 9, wherein the ionizing radiation curable compound (C) has a (meth)acryloyl group.

11. The optical laminate as set forth above in 10, wherein the ionizing radiation curable compound (C) has two or more (meth)acryloyl groups in one molecule.

12. The optical laminate as set forth above in any one of 1 to 11, wherein the ionizing radiation curable compound (C) includes a photocurable fluorine-containing polymer.

13. The optical laminate as set forth above in 12, wherein the photocurable fluorine-containing polymer is a copolymer (P) containing a structural unit derived from a fluorine-containing vinyl monomer and a structural unit having a (meth)acryloyl group in a side chain thereof.

14. The optical laminate as set forth above in 13, wherein the copolymer (P) is represented by the following formula (5).

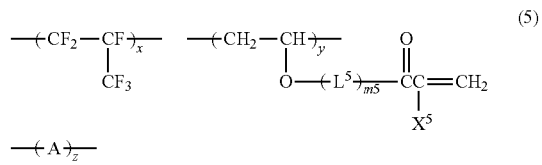

In the foregoing formula (5), $L^5$ represents a connecting group having from 1 to 10 carbon atoms; m5 represents 0 or 1; $X^5$ represents a hydrogen atom or a methyl group; A represents an arbitrary polymerization unit and may be constituted of a single component or plural components; and each of x, y and z represents mole % of a respective constituent component and represents a value satisfied with relations of (30≤x≤60), (5≤y≤70) and (0≤z≤65), respectively.

15. The optical laminate as set forth above in any one of 1 to 14, wherein the ionizing radiation curable compound (C) includes a photocurable fluorine-containing monomer.

16. The optical laminate as set forth above in any one of 1 to 15, wherein the antistatic layer contains an antifouling agent.

17. The optical laminate as set forth above in any one of 1 to 16, wherein an antiglare layer having irregularities on at least one surface thereof is present between the support and the antistatic layer, and the antiglare layer contains a transparent resin and a light diffusible particle.

18. The optical laminate as set forth above in 17, wherein an average particle size of the light diffusible particle of the antiglare layer is from 5.5 to 15 μm, and an average thickness of the antiglare layer is from 8 to 40 μm.

19. The optical laminate as set forth above in 17 or 18, wherein a refractive index of the antistatic layer is lower than a refractive index of the antiglare layer.

20. A polarizing plate comprising a polarizing film and two protective films for protecting the both surfaces of the polarizing film, wherein at least one of the protective films is the optical laminate as set forth above in any one of 1 to 19.

21. A polarizing plate comprising a polarizing film and two protective films for protecting the both surfaces of the polarizing film, wherein one of the protective films is the optical laminate as set forth above in any one of 1 to 19, and the other protective film is an optical compensation film having optical anisotropy.

22. An image display device comprising the optical laminate as set forth above in any one of 1 to 19 or the polarizing plate as set forth above in 20 or 21.

According to the optical laminate of the invention, it is possible to attain high antistatic properties and scar resistance and uniform surface properties. In view of the fact that the conductive material is not able to come into a particle, as compared with the case of using a polymer as a thickener, in the case of using a particle, an actual concentration of the conductive material becomes high, and as a result, high antistatic properties can be attained. Also, in addition to a high hardness of the inorganic particle itself, the particle can be bonded to the binder, and thus, high scar resistance can be attained. Furthermore, because of a thickening effect by the particle at the time of drying, uniform surface properties can be attained.

DETAILED DESCRIPTION OF THE INVENTION

The invention is hereunder described in more detail. In this specification, in the case where a numerical value represents a physical property value, a characteristic value, etc., the terms "from (numerical value 1) to (numerical value 2)" mean "(numerical value 1) or more and not more than (numerical value 2)". Also, in this specification, the term "(meth)acrylate" means "at least one of acrylate and methacrylate". The same is also applicable to the terms "(meth)acrylic acid" or the like.

The optical laminate of the invention is comprised of a support and an antistatic layer formed from a composition (composition for antistatic layer) containing the following (A) to (C) and having an average thickness of from 0.03 to 0.40 μm:

(A) a hydrophobilized conductive polymer composition containing a π-conjugated system conductive polymer and an anion group-containing polymer dopant;

(B) an inorganic fine particle having an average particle size of from 1 to 300 nm; and (C) an ionizing radiation curable compound.

Also, the optical laminate of the invention is comprised of a support and an antistatic layer formed from a composition containing the following (A), (C) and (D) and having an average thickness of from 0.03 to 0.40 μm:

(A) a hydrophobilized conductive polymer composition containing a π-conjugated system conductive polymer and an anion group-containing polymer dopant;

(C) an ionizing radiation curable compound; and (D) an organic fine particle having an average particle size of from 1 to 300 nm.

((A) Hydrophobilized Conductive Polymer Composition Containing a π-Conjugated System Conductive Polymer and an Anion Group-Containing Polymer Dopant)

The conductive polymer composition in the invention contains a π-conjugated system conductive polymer and an anion group-containing polymer dopant. The conductive polymer composition is one having been subjected to a hydrophobilization treatment and preferably contains an organic solvent and forms a uniform solution as a whole.

In the hydrophilized conductive polymer composition, it is preferable that the conductive polymer composition is soluble in an organic solvent having a relative dielectric constant of from 2 to 30 and a water content of not more than 5% by mass in a degree of at least 1.0% by mass at 20° C. The relative dielectric constant as referred to herein means a ratio of a dielectric constant of the organic solvent and a dielectric constant of vacuum and is measured at 20° C. Also, in the invention, the term "soluble" refers to a state where the conductive polymer composition is dissolved in a single molecule state or in a state where a plurality of single molecules are associated, or it is dispersed in a particulate form having a particle size of not more than 300 nm. The "volatile organic solvent" as referred to herein means a compound which after a coating composition of the invention is coated and dried, is substantially vaporized from the coating film and removed.

In general, the π-conjugated system conductive polymer is high in hydrophilicity and is dissolved in a solvent composed mainly of water. However, in the invention, the π-conjugated system conductive polymer is made soluble in the foregoing specified organic solvent through a hydrophobilization treatment as described later. Also, by performing the hydrophobilization treatment, its affinity with the ionizing radiation curable compound (C) is enhanced, thereby enabling one to form an optical laminate having a low surface resistivity.

In the invention, it is preferable that the conductive polymer composition is soluble in the organic solvent in a degree of at least 1.0% by mass. In the case where the conductive polymer composition is present in a particulate form in the organic solvent, its average particle size is not more than 300 nm, preferably not more than 200 nm, and more preferably not more than 100 nm. In order to remove coarse particles or accelerate dissolution, a high-pressure dispersion machine can also be used. Examples of the high-pressure dispersion machine include Gaulin (manufactured by APV Gaulin), Nanomizer (manufactured by Nanomizer Inc.), Microfluidizer (manufactured by Microfluidics), Multimizer (manufactured by Sugino Machine Limited) and DeBee (manufactured by Bee). The particle size can be observed after scooping up an organic solvent solution on a grid for electron microscopic observation and vaporizing the solvent. So far as the particle size falls within the foregoing range, since sedimentation in the organic solvent is suppressed, a composition for antistatic layer containing such a conductive polymer composition is suitably useful as a coating solution.

(π-Conjugated System Conductive Polymer)

The π-conjugated system conductive polymer is not particularly limited so far as it is an organic polymer whose main chain is constituted of a π-conjugated system.

Examples of the π-conjugated system conductive polymer include polypyrroles, polythiophenes, polyacetylenes, polyphenylenes, polyphenylvinylenes, polyanilines, polyacenes and polythiophenevinylenes. From the standpoint of stability in air, polypyrroles, polythiophenes and polyanilines are preferable; and polythiophenes and polyanilines are more preferable. Polythiophene and polythiophene derivatives are generically named "polythiophenes". The same is also applicable to the others.

Even when the π-conjugated system conductive polymer is unsubstituted, sufficient conductivity and affinity with a binder resin are obtainable. However, in order to more enhance the conductivity and affinity, it is preferable to introduce a functional group such as an alkyl group, a carboxy group, a sulfo group, an alkoxy group and a hydroxyl group into the π-conjugated system conductive polymer.

Specific examples of the π-conjugated system conductive polymer include:

polypyrroles such as polypyrrole, poly(N-methylpyrrole), poly(3-methylpyrrole), poly(3-ethylpyrrole), poly(3-n-propylpyrrole), poly(3-butylpyrrole), poly(3-octylpyrrole), poly(3-decylpyrrole), poly(3-dodecylpyrrole), poly(3,4-dimethylpyrrole), poly(3,4-dibutylpyrrole), poly(3-carboxypyrrole), poly(3-methyl-4-carboxypyrrole), poly(3-methyl-4-carboxyethylpyrrole), poly(3-methyl-4-carboxybutylpyrrole), poly(3-hydroxypyrrole), poly(3-methoxypyrrole), poly(3-ethoxypyrrole), poly(3-butoxypyrrole) and poly(3-methyl-4-hexyloxypyrrole);

polythiophenes such as poly(thiophene), poly(3-methylthiophene), poly(3-ethylthiophene), poly(3-propylthiophene), poly(3-butylthiophene), poly(3-hexylthiophene), poly(3-heptylthiophene), poly(3-octylthiophene), poly(3-decylthiophene), poly(3-dodecylthiophene), poly(3-octadecylthiophene), poly(3-bromothiophene), poly(3-chlorothiophene), poly(3-iodothiophene), poly(3-cyanothiophene), poly(3-phenylthiophene), poly(3,4-dimethylthiophene), poly(3,4-dibutylthiophene), poly(3-hydroxythiophene), poly(3-methoxythiophene), poly(3-ethoxythiophene), poly(3-butoxythiophene), poly(3-hexyloxythiophene), poly(3-heptyloxythiophene), poly(3-octyloxythiophene), poly(3-decyloxythiophene), poly(3-dodecyloxythiophene), poly(3-octadecyloxythiophene), poly(3-methyl-4-methoxythiophene), poly(3,4-ethylenedioxythiophene), poly(3-methyl-4-ethoxythiophene), poly(3-carboxythiophene), poly(3-methyl-4-carboxythiophene), poly(3-methyl-4-caboxyethylthiophene) and poly(3-methyl-4-carboxybutylthiophene); and polyanilines such as polyaniline, poly(2-methylaniline), poly(3-isobutylaniline), poly(2-anilinesulfonic acid) and poly(3-anilinesulfonic acid).

A content of the π-conjugated system conductive polymer is preferably from 1% by mass to 60% by mass, and more preferably from 5% by mass to 40% by mass relative to the whole of solids of the antistatic layer. So far as the content of the π-conjugated system conductive polymer is 1% by mass or more, a surface resistivity of the optical laminate can be regulated to not more than $1 \times 10^{13}$ Ω/sq, and the optical laminate is excellent in dustproof properties. So far as the content of the π-conjugated system conductive polymer is not more than 60% by mass, the strength of the optical laminate can also be kept.

A molecular weight of the π-conjugated system conductive polymer is preferably from 1,000 to 1,000,000, and more preferably from 5,000 to 500,000. In the case where the conductive polymer is present in a particulate form, an average particle size is preferably from 5 to 300 nm, and more preferably from 10 to 150 nm. Also, the particle may be monodispersed or polydispersed.

(Anion Group-Containing Polymer Dopant)

As the anion group-containing polymer dopant (also referred to as "polyanion dopant"), there is exemplified a polymer having at least one structure of a substituted or unsubstituted polyalkylene, a substituted or unsubstituted polyalkenylene, a substituted or unsubstituted polyimide, a substituted or unsubstituted polyamide and a substituted or unsubstituted polyester and containing an anion group-containing structural unit.

The polyalkylene as referred to herein is a polymer whose main chain is constituted of a methylene repeating unit. Examples of the polyalkylene include polyethylene, polypropylene, polybutene, polypentene, polyhexene, polyvinyl alcohol, polyvinylphenol, poly(3,3,3-trifluoropropylene), polyacrylonitrile, polyacrylates and polystyrene.

The polyalkenylene as referred to herein is a polymer composed of a structural unit containing an unsaturated double bond (vinyl group) in a main chain thereof.

Examples of the polyimide include polyimides composed of an acid anhydride (for example, pyromellitic acid dianhydride, biphenyltetracarboxylic acid dianhydride, benzophenonetetracarboxylic acid dianhydride, 2,2'-[4,4'-di(dicarboxyphenyloxy)phenyl]propane dianhydride, etc.) and a diamine (for examples, oxydiamine, p-phenylenediamine, m-phenylenediamine, benzophenonediamine, etc.).

Examples of the polyamide include polyamide 6, polyamide 6,6 and polyamide 6,10.

Examples of the polyester include polyethylene terephthalate and polybutylene terephthalate.

In the case where the foregoing polyanion dopant has a substituent, examples of the substituent include an alkyl group, a hydroxyl group, an amino group, a carboxy group, a cyano group, a phenyl group, a phenol group, an ester group and an alkoxy group. When solubility in an organic solvent, heat resistance, affinity with a binder resin and the like are taken into consideration, an alkyl group, a hydroxyl group, a phenol group and an ester group are preferable.

Examples of the alkyl group include chain (linear or branched) alkyl groups such as methyl, ethyl, propyl, butyl, isobutyl, t-butyl, pentyl, hexyl, octyl, decyl and dodecyl; and cycloalkyl groups such as cyclopropyl, cyclopentyl and cyclohexyl.

Examples of the hydroxyl group include a hydroxyl group bonded to the main chain of the polyanion dopant directly or via other functional group. Examples of other functional group include an alkyl group having from 1 to 7 carbon atoms, an alkenyl group having from 2 to 7 carbon atoms, an amide group and an imide group. The hydroxyl group is substituted on an end of or in such a functional group.

Examples of the amino group include an amino group bonded to the main chain of the polyanion dopant directly or via other functional group. Examples of other functional group include an alkyl group having from 1 to 7 carbon atoms, an alkenyl group having from 2 to 7 carbon atoms, an amide group and an imide group. The amino group is substituted on an end of or in such a functional group.

Examples of the phenol group include a phenol group bonded to the main chain of the polyanion dopant directly or via other functional group. Examples of other functional group include an alkyl group having from 1 to 7 carbon atoms, an alkenyl group having from 2 to 7 carbon atoms, an amide group and an imide group. The phenol group is substituted on an end of or in such a functional group.

Examples of the ester group include an ester group bonded to the main chain of the polyanion dopant directly or via other functional group. Examples of other functional group include an alkyl group having from 1 to 7 carbon atoms, an alkenyl group having from 2 to 7 carbon atoms, an amide group and an imide group. The ester group is substituted on an end of or in such a functional group.

Any anion group is useful as the anion group of the polyanion dopant so far as it is able to be oxidized and doped into the π-conjugated system conductive polymer, and examples thereof include a sulfate group, a phosphate group, a sulfo group, a carboxy group and a phospho group. $-O-SO_3^-X^+$, $-SO_3^-X^+$ and $-COO^-X^+$ (wherein $X^+$ represents a hydrogen ion or an alkali metal ion) are preferable.

Of these, $-SO_3^-X^+$ and $-COO^-X^+$ are more preferable from the standpoint of doping ability into the π-conjugated system conductive polymer.

Of the foregoing polyanion dopants, polyisoprenesulfonic acid, a copolymer containing polyisoprenesulfonic acid, polysulfoethyl methacrylate, a copolymer containing polysulfoethyl methacrylate, poly(4-sulfobutyl methacrylate), a copolymer containing poly(4-sulfobutyl methacrylate), polymethacryloxybenzenesulfonic acid, a copolymer containing polymethacryloxybenzenesulfonic acid, polystyrenesulfonic acid and a copolymer containing polystyrenesulfonic acid are preferable from the standpoints of solvent solubility and conductivity.

As to a degree of polymerization of the polyanion dopant, a monomer unit number is preferably in the range of from 10 to 100,000, and it is more preferably in the range of from 50 to 10,000 from the standpoints of solvent solubility and conductivity. A molecular weight of the polyanion dopant is preferably in the range of from 1,000 to 30,000,000, and more preferably in the range of from 5,000 to 300,000.

A content of the polyanion dopant is preferably in the range of from 0.1 to 10 moles, and more preferably in the range of from 1 to 7 moles per mole of the π-conjugated system conductive polymer. Here, the molar number is defined by a structural unit number derived from an anion group-containing monomer capable of forming the polyanion dopant and a structural unit number derived from a monomer capable of forming the π-conjugated system conductive polymer, such as pyrrole, thiophene and aniline. So far as the content of the polyanion dopant is 0.1 moles or more per mole of the π-conjugated system conductive polymer, a doping effect into the π-conjugated system conductive polymer becomes large, and the conductivity is sufficiently revealed. In addition, the dispersibility and solubility in a solvent becomes high, and it is easy to obtain a uniform dispersion. Also, so far as the content of the polyanion dopant is not more than 10 moles per mole of the π-conjugated system conductive polymer, a large amount of the π-conjugated system conductive polymer can be contained, and sufficient conductivity is easily obtainable.

A total content of the π-conjugated system conductive polymer and the polyanion dopant in the composition for antistatic layer is preferably from 1 to 50% by mass, and more preferably from 5 to 30% by mass relative to the whole of solids. So far as the total content of the π-conjugated system conductive polymer and the polyanion dopant is 1% by mass or more, sufficient conductivity is obtainable. So far as the total content of the π-conjugated system conductive polymer and the polyanion dopant is not more than 50% by mass, gelation or deterioration of coating surface properties hardly occurs.

Though a combination of the π-conjugated system conductive polymer and the polyanion dopant is not particularly limited, examples thereof include polyethylenedioxythiophene.polystyrenesulfonic acid (PEDOT.PSS), polyethylenedioxythiophene.polyisoprenesulfonic acid, polyethylenedioxythiophene.2-acrylamide-methylpropanesulfonic acid, polyaniline.polystyrenesulfonic acid, polyaniline.polyisoprenesulfonic acid, polyaniline.2-acrylamide-methylpropanesulfonic acid, polypyrrole.polystyrenesulfonic acid, polypyrrole.polyisoprenesulfonic acid, polypyrrole.2-acrylamide-methylpropanesulfonic acid and copolymers containing such a component.

Of these, polyethylenedioxythiophene.polystyrenesulfonic acid (PEDOT.PSS), polyethylenedioxythiophene.polyisoprenesulfonic acid, polyaniline.2-acrylamide-methylpropanesulfonic acid and copolymers containing such a component are preferable.

(Hydrophobilization Treatment of Conductive Polymer Composition)

In the invention, it is essential to subject the conductive polymer composition to a hydrophobilization treatment from the standpoints of enhancing the solubility of the conductive polymer composition in an organic solvent, enhancing the affinity with the ionizing radiation curable compound (C) and the like. Examples of the hydrophobilization treatment include a treatment of modifying the anion group of the polyanion dopant to achieve the hydrophobilization.

As a method for performing the hydrophobilization, examples of a first method include methods in which the anion group is subjected to esterification, etherification, acetylation, tosylation, tritylation, alkylsilylation or alkylcarbonylation. Of these, esterification and etherification are preferable. Examples of a method for achieving the hydrophobilization by esterification include a method in which the anion group of the polyaniline dopant is chlorinated with a chlorinating agent, followed by esterification with an alcohol such as methanol and ethanol. Also, the hydrophobilization can be achieved through esterification with a sulfo group or a carboxyl group using a compound having a hydroxyl group or a glycidyl group and also having an unsaturated double bonding group.

In the invention, various methods which have been conventionally known can be adopted. An example thereof is specifically disclosed in JP-A-2005-314671, JP-A-2006-28439 and the like.

Examples of a second method for performing the hydrophobilization include a method in which a basic compound is bonded to the anion group of the polyanion dopant, thereby achieving the hydrophobilization. As the basic compound, an amine based compound is preferable, and examples thereof include primary amines, secondary amines, tertiary amines and aromatic amines. Specific examples thereof include primary, secondary or tertiary amines substituted with an alkyl group having from 1 to 20 carbon atoms; an imidazole substituted with an alkyl group having from 1 to 20 carbon atoms; and pyridine. For the purpose of enhancing the solubility in an organic solvent, a molecular weight of the amine is preferably from 50 to 2,000, more preferably from 70 to 1,000, and most preferably from 80 to 500.

An amount of the amine compound which is a basic hydrophobilizing agent is preferably from 0.1 to 10.0 molar equivalents, more preferably from 0.5 to 2.0 molar equivalents, and especially preferably from 0.85 to 1.25 molar equivalents to the anion group of the polyanion dopant which does not contribute to doping of the π-conjugated system conductive polymer. So far as the amount of the amine compound falls within the foregoing range, solubility in an organic solvent, conductivity and strength of a coating film can be satisfied.

In the invention, various methods which have been conventionally known can be adopted. An example thereof is specifically disclosed in JP-A-2008-115215, JP-A-2008-115216 and the like.

(Organic Solvent Having a Relative Dielectric Constant of from 2 to 30)

In the invention, in order to prepare the composition for antistatic layer containing a conductive polymer composition and an ionizing radiation curable compound, it is preferable that the conductive polymer composition can be dispersed with an organic solvent having a relative dielectric constant of from 2 to 30 and a water content of not more than 5% by mass.

As such an organic solvent, for example, an alcohol, an aromatic hydrocarbon, an ether, a ketone, an ester and the like are suitable. Compounds are exemplified below, and a relative dielectric constant is expressed in each of the parentheses.

Examples of the alcohol include a monohydric alcohol and a dihydric alcohol, and of these, the monohydric alcohol is preferably a saturated aliphatic alcohol having from 2 to 8 carbon atoms. Specific examples of such an alcohol include ethyl alcohol (25.7), n-propyl alcohol (21.8), isopropyl alcohol (18.6), n-butyl alcohol (17.1), sec-butyl alcohol (15.5) and tert-butyl alcohol (11.4). Also, specific examples of the aromatic hydrocarbon include benzene (2.3), toluene (2.2) and xylene (2.2); specific examples of the ether include tetrahydrofuran (7.5), ethylene glycol monomethyl ether (16), ethylene glycol monomethyl ether acetate (8), ethylene glycol monoethyl ether (14), ethylene glycol monoethyl ether acetate (8) and ethylene glycol monobutyl ether (9); specific examples of the ketone include acetone (21.5), diethyl ketone (17.0), methyl ethyl ketone (15.5), diacetone alcohol (18.2), methyl isobutyl ketone (13.1) and cyclohexanone (18.3); and specific examples of the ester include methyl acetate (7.0), ethyl acetate (6.0), propyl acetate (5.7) and butyl acetate (5.0).

From the viewpoint of the fact that both the conductive polymer composition and the ionizing radiation curable compound can be dissolved and dispersed, the relative dielectric constant of the organic solvent is more preferably from 2.3 to 24, further preferably from 4.0 to 21, and especially preferably from 5.0 to 21. For example, isopropyl alcohol, acetone, propylene glycol monoethyl ether, cyclohexane and methyl acetate are preferable, with isopropyl alcohol, acetone and propylene glycol monoethyl ether being especially preferable.

The organic solvent having a relative dielectric constant of from 2 to 30 can also be used in admixture of two or more kinds thereof. Also, though an organic solvent having a relative dielectric constant exceeding 30 or water (an amount of which is, however, not more than 5% by mass of the whole) can be used jointly, it is preferable that a relative dielectric constant of the mixed solvent (a mass average relative dielectric constant of the organic solvent and water to be contained)

is from 2 to 30. By making the relative dielectric constant fall within the foregoing range, a coating solution having both the conductive polymer composition and the ionizing radiation curable compound dissolved and dispersed therein can be formed, and an optical laminate having favorable surface properties of the coating film can be formed.

(Solubilization Aid)

A solubilization aid may be contained in the conductive polymer composition.

By using the solubilization aid, the solubilization of the π-conjugated system conductive polymer in an organic solvent having a low water content can be aided, and furthermore, the coating surface properties of the composition for antistatic layer can be improved, or the strength of the cured film can be increased.

The solubilization aid is preferably a copolymer having a hydrophilic site, a hydrophobic site and an ionizing radiation curable functional group-containing site, and especially preferably a block type or graft type copolymer in which these sites are separated into segments. Such a copolymer can be subjected to living anion polymerization or living radical polymerization, or can be polymerizing using a macromonomer having the foregoing sites.

The solubilization aid is disclosed in, for example, [0022] to [0038] of JP-A-2006-176681 or the like.

In the solubilization aid, in the case of a copolymer, a proportion of structural units in the hydrophilic segment and the hydrophobic segment is preferably from 1/99 to 60/40, and more preferably from 2/98 to 30/70 in terms of a mass ratio. A use amount of the solubilization aid is preferably from 1 to 100% by mass, more preferably from 2 to 70% by mass, and most preferably from 5 to 50% by mass relative to the total sum of the π-conjugated system conductive polymer and the polyanion dopant.

(Low Molecular Weight Dopant)

In the invention, it is also preferably to jointly use a low molecular weight dopant in addition to the polyanion dopant. As the low molecular weight dopant, a compound having not more than 2 anion groups in one molecule and having a molecular weight of not more than 1,000 is preferable. Above all, it is preferable that at least one member of compounds selected from the group consisting of 2-acrylamide-2-methyl-1-propanesulfonic acid, 1,1-oxybistetrapropylene derivatives, sodium benzenesulfonate and vinyl allyl sulfonate.

(Preparation Method of Conductive Polymer Composition)

The conductive polymer composition in the invention is preferably one in which the π-conjugated system conductive polymer and the polyanion dopant are dissolved or dispersed in an organic solvent. Here, it is preferable that the water content of the organic solvent is not more than 5% by mass.

As a method for preparing such a conductive polymer composition, though there are various methods, the following two methods are preferable.

A first method is a method in which the monomer is polymerized in water in the copresence of the polyanion dopant to form the π-conjugated system conductive polymer; if desired, the π-conjugated system conductive polymer is then treated by the addition of the foregoing solubilization aid or basic hydrophobilizing agent; and thereafter, water is displaced with the organic solvent.

A second method is a method in which the monomer is polymerized in water in the copresence of the polyanion dopant to form the π-conjugated system conductive polymer; if desired, the π-conjugated system conductive polymer is then treated by the addition of the foregoing solubilization aid or basic hydrophobilizing agent; and after water is evaporated to dryness, the organic solvent is added to achieve the solubilization.

In the foregoing methods, a use amount of the solubilization aid is preferably from 1 to 100% by mass, more preferably from 2 to 70% by mass, and most preferably from 5 to 50% by mass relative to the total sum of the π-conjugated system conductive polymer and the polyanion dopant.

Also, in the first method, a method for displacing water with the organic solvent is preferably a method in which after a solvent with high water miscibility, such as ethanol, isopropyl alcohol and acetone, is added to form a uniform solution, ultrafiltration is performed to remove water. Also, there is exemplified a method in which after the water content is lowered to some extent by using a solvent with high water miscibility, a more hydrophobic solvent is mixed, and a highly volatile component is removed under reduced pressure to regulate the solvent composition. Also, when sufficient hydrophobilization is performed using the basic hydrophobilizing agent, an organic solvent with low water miscibility is added to form a separated two-phase system, thereby making it possible to extract the π-conjugated system conductive polymer in an aqueous phase into an organic solvent phase.

((B) Inorganic Fine Particle Having an Average Particle Size of from 1 to 300 nm)

The antistatic layer in the invention can contain (B) an inorganic fine particle having an average particle size of from 1 to 300 nm (also referred to as "inorganic fine particle (B)") from the viewpoints of an improvement in scar resistance, an improvement in surface properties and an enhancement in conductivity.

The average particle size of the inorganic fine particle (B) is preferably from 5 to 100 nm, and more preferably from 10 to 80 nm.

The average particle size of the inorganic fine particle (B) can be calculated as an average of 100 particles through observation by a transmission electron microscope.

When a particle having a larger size is used as the inorganic fine particle (B), the scar resistance is enhanced; however, a problem of whitening is easy to occur. For that reason, it is more preferable to use two kinds of particles having a different average particle size from each other because by using a large-sized particle on a level where whitening is not caused and further jointly using a small-sized particle which hardly causes whitening, the scar resistance can be more increased.

In the case of using two kinds of particles having a different average particle size from each other as the inorganic fine particle (B), the average particle size of the large-sized particle is preferably from 40 to 300 nm, more preferably from 40 to 100 nm, and further preferably from 40 to 80 nm. The average particle size of the small-sized particle is preferably from 1 to 40 nm, more preferably from 5 to 30 nm, and further preferably from 10 to 20 nm.

The total sum of the inorganic fine particles is preferably 10% by mass or more and not more than 40% by mass, and more preferably 20% by mass or more and not more than 35% by mass relative to the whole of solids of the antistatic layer.

Examples of the inorganic fine particle (B) include silica, alumina, zirconia, titania, zinc oxide, germanium oxide, indium oxide, tin oxide, cerium oxide and magnesium fluoride. Of these, a silica fine particle is preferable from the standpoints of refractive index, dispersion stability and costs.

In general, a conductive metal oxide is not preferable because it is high in a refractive index so that it lowers a function as a low-refractive index layer.

In using only a fine particle having a single average particle size as the silica fine particle, when the average particle size is too small, an effect for improving the scar resistance becomes small, whereas when the average particle size is too large, the silica fine particle is exposed on the surface of the antistatic layer, and whitening of the optical laminate is generated. The silica fine particle may be either crystalline or amorphous. Also, the silica fine particle may be a monodispersed particle or a coagulated particle so far as it is satisfied with the requirement that the average particle is from 1 to 300 nm. Though a shape of the silica fine particle is most preferably spherical, there is no problem even when it is amorphous.

The foregoing matters mentioned regarding the silica fine particle are also applicable to the inorganic fine particles of other kinds.

In order to contrive to realize a low refractive index of the antistatic layer in the invention, a fine particle having pores in the inside thereof is preferable as the inorganic fine particle (B), and it is more preferable to use a fine particle of a hollow structure (hollow fine particle). A porosity of the hollow fine particle is preferably from 10 to 80%, more preferably from 20 to 60%, and most preferably from 30 to 60%. What the porosity of the hollow fine particle is made to fall within the foregoing range is preferable from the viewpoints of realizing a low refractive index and keeping durability of the particle.

In the case where the hollow fine particle is silica, a refractive index of the fine particle is preferably from 1.10 to 1.40, more preferably from 1.15 to 1.35, and most preferably from 1.15 to 1.30. Here, the refractive index expresses a refractive index as the whole of the particle but does not express a refractive index of only silica as a shell which forms the silica particle.

Also, as to the hollow silica fine particle, two or more kinds of fine particles having a different average particle size from each other can be used jointly. Here, the average particle size of hollow silica can be determined from an electron microscopic photograph.

(Surface Treatment of Inorganic Fine Particle (B))

A surface treatment of the inorganic fine particle (B) is described. For the purpose of improving the dispersibility in the ionizing radiation curable compound (C) as the binder for forming an antistatic layer and the scar resistance, it is preferable that the surface of the inorganic fine particle (B) is treated with at least one of a hydrolyzate of an organosilane compound and a partial condensate of the hydrolyzate. Also, it is more preferable that at least one of an acid catalyst and a metal chelate compound is used in the subject treatment.

(Organosilane Compound)

The organosilane compound which can be used for the surface treatment of the inorganic fine particle (B) is described. The organosilane compound is preferably represented by the following formula (1).

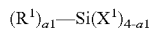
$(R^1)_{a1}$—Si$(X^1)_{4-a1}$     Formula (1)

In the foregoing formula, $R^1$ represents a substituted or unsubstituted alkyl group or a substituted or unsubstituted aryl group; $X^1$ represents a hydroxyl group or a hydrolyzable group; a1 represents an integer of from 1 to 3; and when plural $R^1$s or $X^1$s are present, each $R^1$ or $X^1$ may be the same as or different from every other $R^1$ or $X^1$.

In the case where $R^1$ in the foregoing formula (1) represents an alkyl group, the alkyl group has preferably from 1 to 30 carbon atoms, more preferably from 1 to 16 carbon atoms, and especially preferably from 1 to 6 carbon atoms. Examples of the alkyl group include a methyl group, an ethyl group, a propyl group, an isopropyl group, a t-butyl group, a sec-butyl group, a pentyl group, a hexyl group, a decyl group and a hexadecyl group.

In the case where $R^1$ in the foregoing formula (1) represents an aryl group, the aryl group has preferably from 6 to 14 carbon atoms, more preferably from 6 to 12 carbon atoms, and especially preferably from 6 to 10 carbon atoms. Examples of the aryl group include a phenyl group and a naphthyl group, with a phenyl group being preferable.

$X^1$ in the foregoing formula (1) represents a hydroxyl group or a hydrolyzable group. Examples of the hydrolyzable group include an alkoxy group (an alkoxy group having from 1 to 5 carbon atoms is preferable, and examples thereof include a methoxy group and an ethoxy group), a halogen atom (for example, Cl, Br, I, etc.) and a group represented by RCOO— (wherein R is preferably a hydrogen atom or an alkyl group having from 1 to 5 carbon atoms; and examples thereof include $CH_3COO$— and $C_2H_5COO$—), Of these, an alkoxy group is preferable; and a methoxy group and an ethoxy group are especially preferable.

a1 in the foregoing formula (1) represents an integer of from 1 to 3. a1 is preferably 1 or 2, and more preferably 1.

Though the substituent which $R^1$ in the foregoing formula (1) may have is not particularly limited, examples thereof include a halogen atom (for example, a fluorine atom, a chlorine atom, a bromine atom, etc.), a hydroxyl group, a mercapto group, a carboxyl group, an epoxy group, an alkyl group (for example, a methyl group, an ethyl group, an isopropyl group, a propyl group, a t-butyl group, etc.), an aryl group (for example, a phenyl group, a naphthyl group, etc.), an aromatic heterocyclic group (for example, a furyl group, a pyrazolyl group, a pyridyl group, etc.), an alkoxy group (for example, a methoxy group, an ethoxy group, an isopropoxy group, a hexyloxy group, etc.), an aryloxy group (for example, a phenoxy group, etc.), an alkylthio group (for example, a methylthio group, an ethylthio group, etc.), an arylthio group (for example, a phenylthio group, etc.), an alkenyl group (for example, a vinyl group, a 1-propenyl group, etc.), an acyloxy group (for example, an acetoxy group, an acryloyloxy group, a methacryloyloxy group, etc.), an alkoxycarbonyl group (for example, a methoxycarbonyl group, an ethoxycarbonyl group, etc.), an aryloxycarbonyl group (for example, a phenoxycarbonyl group, etc.), a carbamoyl group (for example, a carbamoyl group, an N-methylcarbamoyl group, an N,N-dimethylcarbamoyl group, an N-methyl-N-octylcarbamoyl group, etc.) and an acylamino group (for example, an acetylamino group, a benzoylamino group, an acrylamino group, a methacrylamino group, etc.). Such a substituent may be further substituted with another group. In this specification, even when one which substitutes the hydrogen atom is a single atom, this is dealt as a substituent for the sake of convenience.

In the case where plural $R^1$ are present in the foregoing formula (1), it is preferable that at least one of them is a substituted alkyl group or a substituted aryl group. It is preferable that the substituted alkyl group or substituted aryl group may further have a vinyl polymerizable group. In that case, the compound represented by the formula (1) can be expressed as an organosilane compound having a vinyl polymerizable substituent, which is represented by the following formula (2).

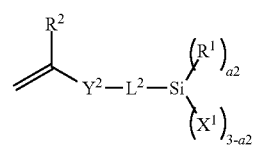

(2)

In the foregoing formula (2), $R^2$ represents a hydrogen atom, a methyl group, a methoxy group, an alkoxycarbonyl group, a cyano group, a fluorine atom or a chlorine atom. Examples of the alkoxycarbonyl group include a methoxycarbonyl group and an ethoxycarbonyl group. $R^2$ is preferably a hydrogen atom, a methyl group, a methoxy group, a methoxycarbonyl group, a cyano group, a fluorine atom or a chlorine atom; more preferably a hydrogen atom, a methyl group, a methoxycarbonyl group, a fluorine atom or a chlorine atom; and further preferably a hydrogen atom or a methyl group.

In the formula (2), $Y^2$ represents a single bond, an ester group, an amide group, an ether group or an ureido group: $Y^2$ is preferably a single bond, an ester group or an amide group; more preferably a single bond or an ester group; and further preferably an ester group.

In the formula (2), $L^2$ represents a divalent connecting group and is preferably a substituted or unsubstituted alkylene group or a substituted or unsubstituted arylene group. The substituted or unsubstituted alkylene group or the substituted or unsubstituted arylene group may have another connecting group (for example, an ether group, an ester group, an amide group, etc.) in the inside thereof. Above all, a substituted or unsubstituted alkylene group having from 2 to 10 carbon atoms, a substituted or unsubstituted arylene group having from 6 to 20 carbon atoms and an alkylene group having from 3 to 10 carbon atoms and having a connecting group in the inside thereof are preferable; an unsubstituted alkylene group, an unsubstituted arylene group and an alkylene group having an ether connecting group or an ester connecting group in the inside thereof are more preferable; and an unsubstituted alkylene group and an alkylene group having an ether connecting group or an ester connecting group in the inside thereof are especially preferable. Examples of the substituent or the substituent which the substituted arylene group has include a halogen, a hydroxyl group, a mercapto group, a carboxyl group, an epoxy group, an alkyl group and an aryl group. Such a substituent may be further substituted with another substituent.

In the formula (2), a2 represents 0 or 1. When plural $X^1$s are present, each $X^1$ may be the same as or different from every other $X^1$. a2 is preferably 0.

In the formula (2), $R^1$ is synonymous with $R^1$ in the foregoing formula (1) and is preferably a substituted or unsubstituted alkyl group or an unsubstituted aryl group, and more preferably an unsubstituted alkyl group or unsubstituted aryl group.

In the formula (2), $X^1$ is synonymous with $X^1$ in the foregoing formula (1) and is preferably a halogen, a hydroxyl group or an unsubstituted alkoxy group, more preferably chlorine, a hydroxyl group or an unsubstituted alkoxy group having from 1 to 6 carbon atoms, further preferably a hydroxyl group or an unsubstituted alkoxy group having from 1 to 3 carbon atoms, and especially preferably a methoxy group.

The organosilane compound which can be used for the surface treatment of the inorganic fine particle (B) is preferably one represented by the following formula (3).

$$(Rf-L^3)_{a1}-Si(X^1)_{4-a1} \qquad \text{Formula (3)}$$

In the foregoing formula (3), Rf represents a linear, branched or cyclic fluorine-containing alkyl group having from 1 to 20 carbon atoms or a fluorine-containing aromatic group having from 6 to 14 carbon atoms. Rf is preferably a linear, branched or cyclic fluoroalkyl group having from 3 to 10 carbon atoms, and more preferably a linear fluoroalkyl group having from 4 to 8 carbon atoms.

In the foregoing formula (3), $L^3$ represents a divalent connecting group having not more than 10 carbon atoms, preferably an alkyl group having from 1 to 10 carbon atoms, and more preferably an alkylene group having from 1 to 5 carbon atoms. The alkylene group is a linear or branched, substituted or unsubstituted alkylene group which may have a connecting group (for example, an ether, an ester, an amide, etc.) in the inside thereof. The alkylene group may have a substituent. In that case, examples of the preferred substituent include a halogen, a hydroxyl group, a mercapto group, a carboxyl group, an epoxy group, an alkyl group and an aryl group.

In the foregoing formula (3), $X^1$ is synonymous with $X^1$ in the foregoing formula (1) and is preferably a halogen, a hydroxyl group or an unsubstituted alkoxy group, more preferably chlorine, a hydroxyl group or an unsubstituted alkoxy group having from 1 to 6 carbon atoms, further preferably a hydroxyl group or an alkoxy group having from 1 to 3 carbon atoms, and especially preferably a methoxy group.

In the foregoing formula (3), a1 is synonymous with a1 in the foregoing formula (1) and represents an integer of from 1 to 3. a1 is preferably 1 or 2, and especially preferably 1.

Of the fluorine-containing silane coupling agents represented by the formula (3), a fluorine-containing silane coupling agent represented by the following formula (4) is especially preferable.

$$C_nF_{2n+1}-(CH_2)_m-Si(X^4)_3 \qquad \text{Formula (4)}$$

In the foregoing formula (4), n1 represents an integer of from 1 to 10, and n represents an integer of from 1 to 5. n is preferably from 4 to 10, and m is preferably from 1 to 3. $X^4$ represents a methoxy group, an ethoxy group or a chlorine atom:

The compound represented by the foregoing formula (1), formula (2), formula (3) or formula (4) may be used in combinations of two or more kinds thereof.

Also, a disiloxane based compound can be used as the surface treating agent. Examples thereof include hexamethyldisiloxane, 1,3-dibutyltetramethyldisiloxane, 1,3-diphenyltetramethyldisiloxane, 1,3-divinyltetramethyldisiloxane, hexaethyldisiloxane and 3-glycidoxypropylpentamethyldisiloxane.

((C) Ionizing Radiation Curable Compound)

The antistatic layer in the invention can be formed through a polymerization reaction or crosslinking reaction of the ionizing radiation curable compound (C). As the ionizing radiation curable compound (C), a polymerizable group-containing monomer, oligomer or polymer which causes a polymerization reaction directly or by the action of a polymerization initiator upon irradiation with an ionizing radiation can be used. The ionizing radiation curable compound (C) is preferably a polyfunctional compound having two or more polymerizable group in one molecule, and more preferably an ionizing radiation curable polyfunctional monomer. The polymerizable group which the ionizing radiation curable polyfunctional monomer has is preferably a group which is curable with light, an electron beam or a radiation, and more preferably a photocurable group. The photocurable group is preferably a polymerizable unsaturated group or a ring-opening polymerizable group such as a (meth)acryloyl group, a vinyl group, a styryl group, an allyl group and an epoxy group, more preferably a polymerizable unsaturated group, and especially preferably a (meth)acryloyl group. The ionizing radiation curable compound (C) is especially preferably a compound having two or more (meth)acryloyl groups in one molecule.

Specific examples of the photocurable group-containing photopolymerizable polyfunctional monomer include:

(meth)acrylic acid diesters of an alkylene glycol, such as neopentyl glycol acrylate, 1,6-hexanediol (meth)acrylate and propylene glycol di(meth)acrylate;

(meth)acrylic acid diesters of a polyoxyalkylene glycol, such as triethylene glycol di(meth)acrylate, dipropylene glycol di(meth)acrylate, polyethylene glycol di(meth)acrylate and polypropylene glycol di(meth)acrylate;

(meth)acrylic acid diesters of a polyhydric alcohol, such as pentaerythritol di(meth)acrylate; and (meth)acrylic acid diesters of an ethylene oxide or propylene oxide adduct, such as 2,2-bis{4-(acryloxy.diethoxy)phenyl}propane and 2,2-bis{4-(acryloxy.polypropoxy)phenyl}propane.

Furthermore, epoxy (meth)acrylates, urethane (meth)acrylates and polyester (meth)acrylates are also preferably used as the photopolymerizable polyfunctional monomer.

Above all, esters of a polyhydric alcohol and (meth)acrylic acid are preferable. Polyfunctional monomers having three or more (meth)acryloyl groups in one molecule are more preferable. Specific examples thereof include trimethylolpropane tri(meth)acrylate, trimethylolethane tri(meth)acrylate, 1,2,4-cyclohexane tetra(meth)acrylate, pentaglycerol triacrylate, pentaerythritol tetra(meth)acrylate, pentaerythritol tri(meth)acrylate, (di)pentaerythritol triacrylate, (di)pentaerythritol pentaacrylate, (di)pentaerythritol tetra(meth)acrylate, (di) pentaerythritol hexa(meth)acrylate, tripentaerythritol triacrylate and tripentaerythritol hexatriacrylate. Of these, monomers having at least one intramolecular hydroxyl group are preferable from the standpoints of affinity with the organic conductive polymer compound and stability of coating surface properties.

Of the polymerizable unsaturated group-containing compounds, it is preferable to use a compound containing a glycidyl group and/or a hydroxyl group and at least member selected among a methacryl group, an acryl group, a methacrylamide group and an acrylamide group in a molecule thereof. Specific examples of such a compound include those described below.

Examples of a compound having a glycidyl group and a methacryl group (acryl group) include glycidyl methacrylate and glycidyl acrylate.

Examples of a compound having a hydroxyl group and at least member selected among a methacryl group, an acryl group, a methacrylamide group and an acrylamide group include 2-hydroxyethyl methacrylate, 2-hydroxyethyl acrylate, 2-hydroxypropyl methacrylate, 2-hydroxypropyl acrylate, 4-hydroxybutyl methacrylate, 4-hydroxybutyl acrylate, ethyl-α-hydroxymethyl acrylate, pentaerythritol triacrylate, dipentaerythritol monohydroxypentaacrylate, 2-hydroxyethyl acrylamide and 2-hydroxyethyl methacrylamide. Such a compound may be used singly or in admixture of two or more kinds thereof. Of the foregoing illustrative compounds, 2-hydroxyethyl acrylamide, 2-hydroxyethyl methacrylamide, 2-hydroxyethyl acrylate and dipentaerythritol monohydroxypentaacrylate are preferable because the affinity with the conductive polymer composition of the invention is high, with 2-hydroxyethyl acrylamide being more preferable. Such a compound is excellent in coating film surface properties, is able to enhance a crosslinking density of the antistatic layer and is able to enhance heat resistance, resistance to high temperature and high humidity and scar resistance.

The ionizing radiation curable compound (C) may be used in combinations of two or more kinds thereof. For example, for the purpose of controlling the refractive index of the layer, plural kinds of the ionizing radiation curable compounds (C) having a different refractive index from each other can be used.

It is preferable that the polymerization of the ionizing radiation curable compound (C) is performed in the presence of a polymerization initiator upon irradiation with an ionizing radiation. It is preferable to use a photopolymerization initiator for the polymerization reaction of the photopolymerizable polyfunctional monomer. A photo radical polymerization initiator and a photo cation polymerization initiator are preferable as the photopolymerization initiator, with a photo radical polymerization initiator being more preferable.

(Photocurable Fluorine-Containing Polymer)

A photocurable fluorine-containing polymer can also be used as the ionizing radiation curable compound (C). Examples of the photocurable fluorine-containing polymer include a fluorine-containing copolymer containing a structural unit derived from a fluorine-containing monomer and a structural unit for imparting crosslinking reactivity.

Examples of the fluorine-containing monomer which is used as a raw material of the photocurable fluorine-containing polymer include fluoroolefins (for example, fluoroethylene, vinylidene fluoride, tetrafluoroethylene, perfluorooctylethylene, hexafluoropropylene, perfluoro-2,2-dimethyl-1,3-dioxol, etc.); partially or completely fluorinated alkyl ester derivatives of (meth)acrylic acid (for example, BISCOAT 6FM (manufactured by Osaka Organic Chemical Industry Ltd.), M-20202 (manufactured by Daikin Industries, Ltd.), etc.); and completely or partially fluorinated vinyl ethers. Of these, perfluoroolefins are preferable; and hexafluoropropylene is especially preferable from the viewpoints of refractive index, solubility, transparency, availability and the like.

Examples of the structural unit for imparting crosslinking reactivity in the photocurable fluorine-containing polymer include a structural unit obtained by polymerization of a monomer having a crosslinking functional group in a molecule thereof in advance, such as glycidyl (meth)acrylate and glycidyl vinyl ether; a structural unit obtained by polymerization of a monomer having a carboxyl group, a hydroxyl group, an amino group, a sulfo group, etc. (for example, (meth)acrylic acid, methylol (meth)acrylate, a hydroxyalkyl (meth)acrylate, allyl acrylate, hydroxyethyl vinyl ether, hydroxybutyl vinyl ether, maleic acid, crotonic acid, etc.); and a structural unit in which a crosslinking reactive group such as a (meth)acryloyl group is introduced into the foregoing structural unit through a polymerization reaction (for example, this crosslinking reactive group can be introduced by a method for exerting acrylic acid chloride to a hydroxyl group).

In addition to the foregoing structural unit derived from a fluorine-containing monomer and structural unit for imparting crosslinking reactivity, a structural unit derived from a fluorine atom-free monomer can also be properly introduced into the photocurable fluorine-containing polymer. The monomer which can be used jointly is not particularly limited, and examples thereof include olefins (for example, ethylene, propylene, isoprene, vinyl chloride, vinylidene chloride, etc.), acrylic acid esters (for example, methyl acrylate, ethyl acrylate, 2-ethylhexyl acrylate, etc.), methacrylic acid esters (for example, methyl methacrylate, ethyl methacrylate, butyl methacrylate, ethylene glycol dimethacrylate, etc.), styrene derivatives (for example, styrene, divinylbenzene, vinyltoluene, α-methylstyrene, etc.), vinyl ethers (for example, methyl vinyl ether, ethyl vinyl ether, cyclohexyl vinyl ether, etc.), vinyl esters (for example, vinyl acetate, vinyl propionate, vinyl cinnamate, etc.), acrylamides (for example, N-tert-butyl acrylamide, N-cyclohexyl acrylamide, etc.), methacrylamides and acrylonitrile derivatives.

The photocurable fluorine-containing polymer which is especially useful in the invention is a random copolymer of a perfluoroolefin and a vinyl ether or vinyl ester. In particular, it is preferable that the photocurable fluorine-containing polymer has a group which is able to undergo a crosslinking reaction alone (for example, a radical reactive group such as a (meth)acryloyl group, a ring-opening polymerizable group such as an epoxy group and an oxetanyl group, etc.). Such a crosslinking reactive group-containing unit is occupied preferably in a proportion of from 5 to 70% by mole, and especially preferably in a proportion of from 30 to 60% by mole of the whole of structural units of the polymer.

Also, the photocurable fluorine-containing polymer is preferably a copolymer containing a structural unit derived from a fluorine-containing vinyl monomer and a structural unit having a (meth)acryloyl group in a side chain thereof.

As a preferred embodiment of the photocurable fluorine-containing polymer, a polymer represented by the following formula (5) is exemplified.

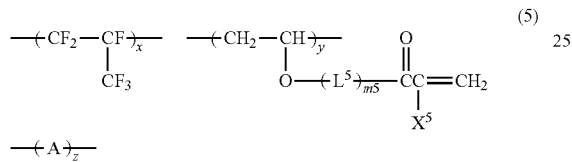

(5)

In the foregoing formula (5), $L^5$ represents a connecting group having from 1 to 10 carbon atoms, preferably a connecting group having from 1 to 6 carbon atoms, and more preferably a connecting group having from 2 to 4 carbon atoms. Such a connecting group may have a linear or branched structure, may have a ring structure and may have a hetero atom selected among O, N and S.

Preferred examples $L^5$ include *—$(CH_2)_2$—O—**, *—$(CH_2)_2$—NH—**, *—$(CH_2)_4$—O—**, *—$(CH_2)_6$—O—**, *—$(CH_2)_2$—O—$(CH_2)_2$—O—**, *—CONH—$(CH_2)_3$—O—**, *—$CH_2CH(OH)CH_2$—O—** and *—$CH_2CH_2OCONH(CH_2)_3$—O—** (wherein * represents a connecting site of the polymer main chain side; and ** represents a connecting site of the (meth)acryloyl group side). m5 represents 0 or 1.

In the formula (5), $X^5$ represents a hydrogen atom or a methyl group; and from the viewpoint of curing reactivity, X is more preferably a hydrogen atom.

In the formula (5), A represents an arbitrary repeating unit and is not particularly limited so far as it is a constituent component of a monomer which is copolymerizable with hexafluoropropylene. A can be properly selected from a variety of viewpoints of adhesion to a support, Tg of a polymer (contributing to the film hardness), solubility in a solvent, transparency, slipperiness, dustproof or antifouling properties and the like and may be constituted of a single vinyl monomer or plural vinyl monomers depending upon the purpose. Preferred examples such a monomer include vinyl ethers such as methyl vinyl ether, ethyl vinyl ether, t-butyl vinyl ether, cyclohexyl vinyl ether, isopropyl vinyl ether, hydroxyethyl vinyl ether, hydroxybutyl vinyl ether, glycidyl vinyl ether and allyl vinyl ether; vinyl esters such as vinyl acetate, vinyl propionate and vinyl butyrate; (meth)acrylates such as methyl (meth)acrylate, ethyl (meth)acrylate, hydroxyethyl (meth)acrylate, glycidyl methacrylate, allyl (meth)acrylate and (meth)acryloyloxypropyltrimethoxysilane; styrene derivatives such as styrene and p-hydroxymethylstyrene; and unsaturated carboxylic acids such as crotonic acid, maleic acid and itaconic acid and derivatives thereof. Of these, vinyl ether derivatives and vinyl ester derivatives are more preferable, with vinyl ether derivatives being especially preferable.

In the formula (5), each of x, y and z represents mole % of a respective constituent component and represents a value satisfied with relations of ($30 \le x \le 60$), ($5 \le y \le 70$) and ($0 \le z \le 65$), respectively. The case of ($35 \le x \le 55$), ($30 \le y \le 60$) and ($0 \le z \le 20$) is preferable; and the case of ($40 \le x \le 55$), ($40 \le y \le 55$) and ($0 \le z \le 10$) is especially preferable.

As a more preferred embodiment of the photocurable fluorine-containing polymer which is used in the invention, a polymer represented by the following formula (6) is exemplified.

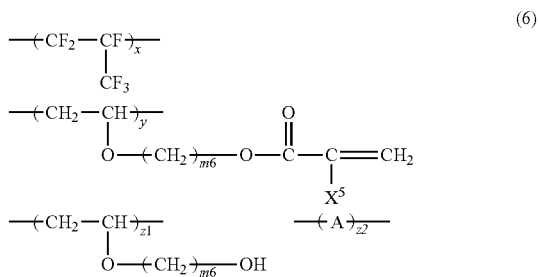

(6)

In the formula (6), $X^5$, x, y and A have the same meanings as in $X^5$, x, y and A in the foregoing formula (5), and preferred ranges thereof are also the same.

m6 represents an integer of ($2 \le m6 \le 10$), preferably ($2 \le m6 \le 6$), and especially preferably ($2 \le m6 \le 4$).

Each of z1 and z2 represents mole % of a respective repeating unit and represents a value satisfied with relations of ($0 \le z1 \le 65$) and ($0 \le z2 \le 65$), respectively. The case of ($0 \le z1 \le 30$) and ($0 \le z2 \le 10$) is preferable; and the case of ($0 \le z1 \le 10$) and ($0 \le z2 \le 5$) is more preferable.

The photocurable fluorine-containing polymer which can be used in the invention is disclosed in paragraphs [0131] to [0161] of JP-A-2005-196122, and specific examples, synthesis method and a curing agent which can be used jointly and the like are also the same in the invention.

Also, a photocurable fluorine-containing monomer can be used as the ionizing radiation curable compound (C). The photocurable fluorine-containing monomer which can be used in the invention is disclosed in JP-A-2006-28409, and specific examples, synthesis method and a curing agent which can be used jointly and the like are also the same in the invention.

From the standpoint of scar resistance, it is preferable that the optical laminate of the invention contains an organosilane compound or a hydrolyzate of the organosilane compound and/or a partial condensate of the hydrolyzate (also referred to as "sol component").

The solve component functions as a binder by coating the ionizing radiation curable component (C), drying and then condensing in a heating step to form a cured material. Also, in the case of using a polyfunctional acrylate polymer as the ionizing radiation curable compound (C), a binder having a three-dimensional structure is formed upon irradiation with an ionizing radiation.

The organosilane compound which is used for the foregoing surface treatment of the inorganic fine particle can be used as the sol component.

A content of the sol component is preferably from 0.1 to 50% by mass, more preferably from 0.5 to 30% by mass, and most preferably from 1 to 20% by mass of the whole of solids of the antistatic layer.

((D) Organic Fine Particle Having an Average Particle Size of from 1 to 300 nm)

The antistatic layer in the invention can contain (D) an organic fine particle having an average particle size of from 1 to 300 nm (also referred to as "organic fine particle (D)") from the viewpoints of an improvement in surface properties, an enhancement in conductivity and an enhancement in saponification resistance.

The average particle size of the organic fine particle (D) is preferably from 5 to 200 nm, and more preferably from 50 to 120 nm. By using the organic fine particle having the foregoing average particle size range, a thickening effect in preparing a coating composition is excellent, and an optical laminate which is small in whitening of a coating film and high in uniformity in surface properties is obtainable.

The average particle size of the organic fine particle (D) can be calculated as an average of 100 particles through observation by a transmission electron microscope.

As the organic fine particle (D), an organic resin particle is exemplified. For example, a radical polymerization system particle composed mainly of a (meth)acrylic resin and a polycondensation system particle composed mainly of melamine or a guanamine based resin can be used. A radical polymerization system particle composed mainly of a (meth)acrylic resin is preferably from the standpoints of easiness of the preparation of a particle and easiness of the regulation of a refractive index.

The foregoing (meth)acrylic resin is not particularly limited, and examples thereof include a homopolymer of a (meth)acrylic monomer and a copolymer of a (meth)acrylic monomer and other vinyl monomer which is copolymerizable with the (meth)acrylic monomer. As the foregoing (meth)acrylic monomer, both a monofunctional monomer and a polyfunctional monomer are useful.

Examples of the monofunctional (meth)acrylic monomer include alkyl (meth)acrylates such as methyl (meth)acrylate, ethyl (meth)acrylate, propyl (meth)acrylate, butyl (meth)acrylate, cumyl (meth)acrylate, cyclohexyl (meth)acrylate, myristyl (meth)acrylate, palmityl (meth)acrylate, stearyl (meth)acrylate and isobornyl (meth)acrylate; and polar group-containing (meth)acrylic monomers such as phenyl (meth)acrylate, benzyl (meth)acrylate, (meth)acrylonitrile, (meth)acrylamide, (meth)acrylic acid, glycidyl (meth)acrylate, 2-hydroxyethyl methacrylate and 2-hydroxypropyl methacrylate.

Examples of the polyfunctional (meth)acrylic monomer include di(meth)acrylates such as ethylene glycol di(meth)acrylate, diethylene glycol di(meth)acrylate, triethylene glycol di(meth)acrylate, 1,6-hexanediol di(meth)acrylate and trimethylolpropane di(meth)acrylate; tri(meth)acrylates such as trimethylolpropane tri(meth)acrylate, ethylene oxide-modified trimethylolpropane tri(meth)acrylate and pentaerythritol tri(meth)acrylate; pentaerythritol tetra(meth)acrylate; and dipentaerythritol hexa(meth)acrylate.

Examples of other vinyl monomer which is copolymerizable with the foregoing (meth)acrylic monomer include aromatic vinyl monomers such as styrene, α-methylstyrene, p-methylstyrene, p-chlorostyrene and divinylbenzene; vinyl esters such as vinyl acetate and vinyl propionate; halogen-containing monomers such as vinyl chloride and vinylidene chloride; vinylpyridine; 2-acryloyloxyethylphthalic acid; itaconic acid; fumaric acid; ethylene; propylene; diallyl acid; triallyl acid; and divinyl compounds.

Examples of a copolymer of the foregoing diallyl acid or triallyl acid include diallyl phthalate, diallyl maleate, diallyl fumarate, diallyl succinate and triallyl isocyanurate.

Of these curable monomers, as a preferred combination, there are exemplified combinations of methyl (meth)acrylate, ethyl (meth)acrylate, butyl (meth)acrylate. phenyl (meth)acrylate, ethylene glycol di(meth)acrylate, diethylene glycol di(meth)acrylate, styrene, divinylbenzene and the like.

As a preferred embodiment of the invention, for the purpose of suppressing the occurrence of whitening of a coating film to be caused due to the fact that in using jointly with the conductive polymer composition, the conductive polymer composition or the organic fine particle is heterogeneously present within the coating film, it is preferable that a difference in refractive index between the organic fine particle and the "(conductive polymer composition)+(binder)" is small. The difference in refractive index is preferably not more than 0.10, more preferably not more than 0.05, and most preferably not more than 0.02. Since the conductive polymer composition is the π-conjugated system compound, in general, there is a tendency that the refractive index increases, and it is preferable that an aromatic group-containing component is contained in the constituent component of the organic fine particle. For example, a material obtained by copolymerizing a component such as methyl (meth)acrylate and ethylene glycol di(meth)acrylate with a component such as phenyl (meth)acrylate and styrene, thereby regulating the refractive index is preferable. A copolymerization ratio of the aromatic group-containing component is preferably from 5% by mole to 80% by mole, and more preferably from 15% by mole to 60% by mole relative to the whole of components. The refractive index of the organic fine particle is preferably from 1.49 to 1.58, and more preferably from 1.51 to 1.55.

In another preferred embodiment of the invention, by lowering the refractive index of the organic fine particle, the refractive index of the antistatic layer can be lowered, and in the case where the organic fine particle is used for the uppermost layer of the optical laminate, it becomes possible to lower the reflectance. The refractive index of the low-refractive index organic fine particle is preferably from 1.15 to 1.48, more preferably from 1.20 to 1.46, and most preferably from 1.25 to 1.43.

Examples of a method for lowering the refractive index of the organic fine particle include a method for using a fluorine atom-containing monomer and a method for providing voids within the particle.

The fluorine atom-containing monomer which is used as the constituent component of the organic fine particle is not particularly limited, and examples thereof include fluoroolefins such as fluoroethylene, vinylidene fluoride, tetrafluoroethylene, hexafluoropropylene and perfluoro-2,2-dimethyl-1,3-dioxol; partially or completely fluorinated alkyl ester derivatives of acrylic or methacrylic acid such as trifluoroethyl methacrylate and perfluorooctylethyl (meth)acrylate; and completely or partially fluorinated vinyl ethers. As such a fluorine atom-containing monomer, both a monofunctional monomer and a polyfunctional monomer are useful. Such a fluorine atom-containing monomer may be used singly or in combinations of two or more kinds thereof.

As a method for introducing voids into the inside of the organic fine particle, there can be adopted a method in which a non-polymerizable compound-containing polymerizable resin particle is prepared, and the non-polymerizable compound is then removed outside the system. For example, there is exemplified a method in which a polymerizable resin particle containing a non-polymerizable compound such as cyclohexanone and cyclohexane is prepared in water, and such a non-polymerizable compound is then removed outside the particle. This method is disclosed in JP-A-2005-213366 and JP-A-2005-215315.

A porosity of the particle having voids in the inside thereof is preferably from 5% to 80%, and more preferably from 10% to 60%. By making the porosity of the particle having voids in the inside thereof fall within the foregoing range, both low refractive index and scar resistance can be satisfied.

Also, in the case of using an organic particle having voids in the inside thereof, a molecular weight of the ionizing radiation curable compound which is the constituent component (C) of the invention is preferably 450 or more, and more preferably 550 or more and not more than 100,000 such that it does not plug the voids upon permeation into the inside of the organic fine particle.

(Polymerization Initiator)

It is preferable that a polymerization initiator is contained in the composition for antistatic layer in the invention. Though various materials can be used as the polymerization initiator, a photopolymerization initiator is preferable. Examples of the photopolymerization initiator include acetophenones, benzoins, benzophenones, phosphine oxides, ketals, anthraquinones, thioxanthones, azo compounds, peroxides, 2,3-dialkyldione compounds, disulfide compounds, fluoroamine compounds, aromatic sulfoniums, lophine dimers, onium salts, borate salts, active esters, active halogens, inorganic complexes and coumarins.

Specific examples, preferred ranges, preferred embodiments, commercially available products and the like of the photopolymerization initiator are disclosed in paragraphs [0133] to [0151] of JP-A-2009-098658, and the same can also be applied in the invention.

(Antifouling Agent)

For the purpose of imparting characteristics such as antifouling resistance, water resistance, chemical resistance and slipperiness to the antistatic layer, the composition for antistatic layer in the invention may contain an antifouling agent. The antifouling agent is preferably a fluorine-containing antifouling agent or a silicone based antifouling agent.

An addition amount of the antifouling agent is preferably in the range of from 0.01 to 20% by mass, more preferably in the range of from 0.05 to 10% by mass, and especially preferably in the range of from 0.1 to 5% by mass relative to the whole of solids of the composition for antistatic layer.

It is preferable that the fluorine-containing antifouling agent has a polymerizable unsaturated group. According to this, it is possible to suppress the transfer of a fluorine compound onto the back surface and improve the scar resistance at the time of storing a coated material in a rolled state and also to enhance the durability against repeated wiping-off of a foul.

Preferred embodiments, specific examples and the like of the fluorine-containing antifouling agent are disclosed in paragraphs [0218] and [0219] of JP-A-2007-301970, and the same can also be applied in the invention.

The silicone based antifouling agent is able to add for the purposes of enhancing the scar resistance due to impartation of slipperiness and imparting antifouling properties, and a compound having a polysiloxane structure is preferable. Preferred embodiments, specific examples and the like of the silicone based antifouling agent are disclosed in paragraphs [0212] and [0217] of JP-A-2007-301970, and the same can also be applied in the invention.

(Antistatic Layer)

An average thickness of the antistatic layer in the invention is from 0.03 to 0.40 µm. By making the average thickness of the antistatic layer fall within the foregoing range, favorable antistatic properties and scar resistance and low coloration are obtainable.

In the optical laminate of the invention, it is preferable that the antistatic layer is formed on the outermost surface. When the antistatic layer is located at the outermost surface, the antistatic effect can be sufficiently revealed. Also, by using a fluorine-containing polymer with a low refractive index as the ionizing radiation curable compound (C) for forming a binder of the antistatic layer, in the case where the refractive index of the antistatic layer is made lower than that of an antiglare layer or a hard coat layer as described later, it is possible to bring about a function of the low-refractive index layer to the antistatic layer. In that case, a thickness of the antistatic layer is preferably from 0.08 µm to 0.12 µm. By making the thickness of the antistatic layer fall within the foregoing range, an interference effect of light can be utilized, and the optical laminate has antireflection properties.

(Antiglare Layer)

The optical laminate of the invention may have an antiglare layer.

Though any antiglare layer is useful so far as it has a fine irregular shape on at least one surface thereof, it is preferable that the antiglare layer contains a transparent resin and a light diffusible particle.

What the antiglare layer contains a light diffusible particle having an average particle size of from 5.5 µm to 15 µm and has an average thickness of from 8 to 40 µm is preferable from a point of visibility (black tightness) in using a polarizing plate including the optical laminate for a liquid crystal display device as well as a point of preventing a scar from occurring against a force applied vertically to the optical laminate.

In providing the antistatic layer containing the conductive polymer composition on the antiglare layer, with the surface irregularities of the antiglare layer as a start, unevenness in the coating thickness or repellence is easy to occur, and the surface properties become easily deteriorated. By taking a configuration of the antistatic layer of the invention, an antiglare, antistatic optical laminate having excellent stability in surface properties is obtainable.

Preferred examples of the transparent resin which is used for the antiglare layer include styrene based resins, (meth)acrylic resins, vinyl ester based resins, vinyl ether based resins, halogen-containing resins, alicyclic olefin based resins, polycarbonate based resins, polyester based resins, polyamide based resins, cellulose derivatives, silicone based resins and rubbers or elastomers. The transparent resin may be used singly or in combinations of plural kinds thereof. In the case of using plural resins, in general, resins which are amorphous and soluble in an organic solvent (in particular, a common solvent capable of dissolving plural resins therein). In particular, resins which are high in moldability or film deposition properties, transparency and weather resistance, for example, styrene based resins, (meth)acrylic resins, alicyclic olefin based resins, polyester based resins, cellulose derivatives (for example, cellulose esters, etc.), etc. are preferably exemplified.

Specific examples of the preferred light diffusible particle include particles of an inorganic compound such as a silica particle and a $TiO_2$ particle; and resin particles such as an acrylate particle, a crosslinked acrylate particle, a polystyrene particle, a crosslinked styrene particle, a melamine resin particle and a benzoguanamine resin particle. Of these, a crosslinked styrene particle, a crosslinked acrylate particle and a silica particle are preferable. As to the shape of the particle, all of a spherical shape and an amorphous shape are useful.

An average particle size of the light diffusible particle is preferably from 5.5 to 15 μm from the viewpoints of antiglare properties and black tightness.

A thickness of the antiglare layer is preferably from 8 μm to 40 μm, more preferably from 10 μm to 35 μm, and most preferably from 11 μm to 25 μm from the viewpoints of antiglare properties and black tightness.

(Hard Coat Layer)

For the purpose of imparting a physical strength, a hard coat layer can be provided on the optical laminate of the invention. The hard coat layer may be made of a single layer or two or more layers.

From the standpoint of an optical design for also bringing about a function of antireflection to the antistatic layer, a refractive index of the hard coat layer in the invention is preferably in the range of from 1.48 to 2.00, more preferably in the range of from 1.52 to 1.90, and further preferably in the range of from 1.55 to 1.80. In the invention, since at least one antistatic layer is located on the hard coat layer, when the refractive index of the hard coat layer is excessively lower than this range, the antireflection properties are lowered, whereas when it is excessively larger than this range, there is a tendency that the color tint of reflected light becomes strong.

From the viewpoint of imparting sufficient durability and impact resistance to the optical laminate, a thickness of the hard coat layer is usually from about 0.5 μm to 50 μm, preferably from 1 μm to 20 μm, more preferably from 2 μm to 10 μm, and further preferably from 3 μm to 7 μm.

A hardness of the hard coat layer is preferably H or more, more preferably 2H or more, and most preferably 3H or more according to the pencil hardness test. Furthermore, it is preferable that an abrasion amount of a specimen before and after the test by the taber test according to JIS K5400 is as small as possible.

It is preferable that the hard coat layer is formed by a crosslinking reaction or polymerization reaction of the ionizing radiation curable compound. For example, the hard coat layer can be formed by coating a coating composition containing an ionizing radiation curable polyfunctional monomer or polyfunctional oligomer on a support and subjecting the polyfunctional monomer or polyfunctional oligomer to a crosslinking reaction or polymerization reaction. A functional group of the ionizing radiation curable polyfunctional monomer or polyfunctional oligomer is preferably a group which is curable with light, an electron beam or a radiation, and more preferably a photocurable group. Examples of the photocurable group include an unsaturated polymerizable group such as a (meth)acryloyl group, a vinyl group, a styryl group and an allyl group, with a (meth)acryloyl group being preferable.

For the purpose of imparting internal scattering properties, a mat particle having an average particle size of from 1.0 to 10.0 μm, and preferably from 1.5 to 7.0 μm, for example, particles of an inorganic compound or resin particles, may be contained in the hard coat layer.

For the purpose of controlling the refractive index of the hard coat layer, either one or both of a high-refractive index monomer and an inorganic particle can be added to the binder of the hard coat layer. The inorganic particle also has an effect for suppressing curing shrinkage to be caused due to the crosslinking reaction, in addition to the effect for controlling the refractive index.

(Support)

The support in the optical laminate of the invention is preferably a transparent support, and more preferably a transparent plastic film. Examples of a polymer capable of forming a plastic film include cellulose esters (for example, triacetyl cellulose, diacetyl cellulose, and representatively TAC-TD80U and TAC-TD80UF (all of which are manufactured by Fujifilm Corporation), etc.), polyamides, polycarbonates, polyesters (for example, polyethylene terephthalate, polyethylene naphthalate, etc.), polystyrenes, polyolefins, norbornene based resins (for example, ARTON (a trade name, manufactured by JSR Corporation)) and amorphous polyolefins (for example, ZEONEX (a trade name, manufactured by Zeon Corporation)). Of these, triacetyl cellulose, polyethylene terephthalate and polyethylene naphthalate are preferable; and triacetyl cellulose is especially preferable.

(Layer Configuration of Optical Laminate)

So far as the simplest configuration is concerned, the optical laminate of the invention has a configuration in which only the antistatic layer is provided on the support. A configuration in which the antiglare layer is further combined for the purpose of imparting antiglare properties is also preferable.

Examples of the layer configuration of the optical laminate of the invention are given below, but it should not be construed that the invention is limited thereto.

Support/antistatic layer
Support/antiglare layer/antistatic layer
Support/hard coat layer/antistatic layer
Support/antistatic layer/low-refractive index layer
Support/hard coat layer/antiglare layer/antistatic layer (Manufacturing Method of Optical Laminate)

The optical laminate of the invention can be manufactured by coating a coating solution composed of a composition for forming each layer on a support and then drying and curing it. However, it should not be construed that the invention is limited thereto.

First of all, a coating solution containing components for forming each layer is prepared. The resulting coating solution is coated on a support by a dip coating method, an air knife coating method, a curtain coating method, a roller coating method, a wire bar coating method, a gravure coating method, an extrusion coating method or the like and then heated and dried. Of these coating modes, a gravure coating method is preferable because a coating solution of a small coating amount can be coated with high uniformity of the thickness. In the gravure coating method, a micro gravure method is more preferable because the uniformly of the thickness is high.

Also, even by adopting a die coating method, a coating solution of a small coating amount can be coated with high uniformity of the thickness, and furthermore, the die coating method is of a pre-metering mode. Thus, this method is relatively easy in controlling the thickness and small in transpiration of the solvent in a coating part. Therefore, the die coating method is also preferable.

Two or more layers may be coated simultaneously. A method of the simultaneous coating is disclosed in U.S. Pat. Nos. 2,761,791, 2,941,898, 3,508,947 and 3,526,528 and described in HARASAKI, Yuji, *Coating Engineering*, page 253, Asakura Shoten (1973).

(Curing Condition of Antistatic Layer)

Preferred examples of a curing method of the antistatic layer in the invention are described below.

In the invention, it is contrived to enhance the strength of the coating film by using the ionizing radiation curable compound (C) for the antistatic layer, and after the coating film is formed, it is effective to perform curing through a combination of the irradiation with an ionizing radiation with a thermal treatment before the irradiation, simultaneously with the irradiation, or after the irradiation.

Some patterns of a manufacturing process of the antistatic layer are hereunder described, but it should not be construed that the invention is limited thereto. The following are shown as (step before the irradiation)→(step simultaneously with the irradiation)→(step after the irradiation) (the term "—" expresses that the thermal treatment is not performed).

(1) (Thermal treatment)→(Curing with ionizing radiation)→—

(2) (Thermal treatment)→(Curing with ionizing radiation)→(Thermal treatment)

(3) —→(Curing with ionizing radiation)→(Thermal treatment)

Besides, a step of performing the thermal treatment simultaneously with the curing with an ionizing radiation is also preferable.

(Thermal Treatment)

In the invention, as described previously, it is also preferable to perform the thermal treatment in combination with the irradiation with an ionizing radiation. Though the thermal treatmentis not particularly limited so far as the constituent layers including the support and the antistatic layer of the optical laminate are not impaired, a temperature of the thermal treatment is preferably from 60 to 200° C., more preferably from 80 to 130° C., and most preferably from 80 to 110° C.

Though a time required for the thermal treatment varies depending upon a molecular weight of each of the components to be used, an interaction with other component, a viscosity and the like, it is from 30 seconds to 24 hours, preferably from 60 seconds to 5 hours, and most preferably from 3 minutes to 30 minutes.

(Irradiation with ionizing radiation)

Though a kind of the ionizing radiation is not particularly limited, examples thereof include X-rays, electron beams, ultraviolet rays, visible light and infrared rays. Of these, ultraviolet rays are broadly used. For example, so far as the coating film is ultraviolet curable, it is preferable to cure each layer upon irradiation with ultraviolet rays at an irradiation dose of from 10 mJ/cm$^2$ to 1,000 mJ/cm$^2$ from an ultraviolet lamp. In performing the irradiation, the foregoing energy may be irradiated at once, or may be irradiated dividedly. In particular, from the standpoint of making scattering in performance within the plane of the coating film small, it is preferable to irradiate the energy in a divided manner of from about 2 to 8 times. Also, in the case of forming other layer than the antistatic layer, the irradiation may be performed for every layer, or after the lamination, the irradiation may be performed on plural layers.

The thermal treatment and the irradiation with an ionizing radiation are disclosed in paragraphs [0148] to [0155] of JP-A-2008-242314, and the same can also be applied in the invention.

(Saponification Treatment)

In the case where the optical laminate of the invention is disposed on the outermost surface of a display by providing an adhesive layer onto one surface or used as a protective film for polarizing plate as it is, for the purpose of achieving sufficient adhesion, after the antistatic layer in the invention is formed on the transparent support, it is preferable to carry out a saponification treatment.

(Polarizing Plate)

The polarizing plate is mainly constituted of two protective films for interposing a polarizing film from the both sides. It is preferable that the optical laminate of the invention is used for at least one of the two protective films for interposing the polarizing film from the both sides. In view of the fact that the optical laminate of the invention also works as the protective film, the manufacturing costs of the polarizing plate can be reduced. Also, an optical compensation film having optical anisotropy can also be used for the other protective film. Known polarizing films can be used as the polarizing film. The polarizing film is disclosed in paragraphs [0299] to [0301] of JP-A-2006-293329, and the same can also be applied in the invention.

(Image display device)

The optical laminate of the invention can be used for various image display devices such as a liquid crystal display device (LCD), a plasma display panel (PDP), an electroluminescent display device (ELD), a cathode ray tube display device (CRT), a field emission display (FED) and a surface-conduction electron-emitter display (SED). The optical laminate of the invention or the polarizing plate including the optical laminate is preferably disposed on the surface of a display of the liquid crystal display device (viewing side of the display screen).

In the case where the optical laminate of the invention is used as one side of a surface protective film of a polarizing film, it can be preferably used for transmission type, reflection type or semi-transmission type liquid crystal display devices of a twisted nematic (TN) mode, a super twisted nematic (STN) mode, a vertical alignment (VA) mode, an in-plane switching (IPS) mode, an optically compensatory bend cell (OCB) mode, an electrically controlled birefringence (ECB) mode, etc. The liquid display device is disclosed in paragraphs [0303] to [0307] of JP-A-2006-293329.

EXAMPLES

The invention is hereunder described in detail with reference to the following Examples, but it should not be construed that the invention is limited thereto.

(Preparation of Coating Solution for Antiglare Layer)

Respective components were mixed in the following composition, and the mixture was filtered through a polypropylene-made filter having a pore size of 30 µm, thereby preparing a coating solution for antiglare layer.

| | |
|---|---|
| PET-30 | 50.9 g |
| BISCOAT 360 | 30.5 g |
| IRGACURE 127 | 3.2 g |
| 8 µm-crosslinked acrylate-styrene particle dispersion (30%) | 35.8 g |
| 8 µm-crosslinked acrylate particle dispersion (30%) | 21.5 g |
| FP-13 | 0.3 g |
| Cellulose acetate butyrate | 7.2 g |
| MIBK | 21.8 g |
| MEK | 28.8 g |

In the foregoing coating solution, a matrix after curing had a refractive index of 1.51.

The above-used particle dispersion was prepared by gradually adding the following particles to an MIBK solution while stirring until a solids concentration reached 30% by mass and stirring the mixture for 30 minutes. Products of Sekisui Plastics Co., Ltd. were used as the resin particles.

8 µm-crosslinked acrylate-styrene particle: refractive index, 1.56 (acrylate/styrene ratio: 3/7)

8 µm-crosslinked acrylate particle: refractive index, 1.50

(Preparation of Coating Solution for Hard Coat Layer)

Respective components were mixed in the following composition, and the mixture was filtered through a polypropylene-made filter having a pore size of 30 µm, thereby preparing a coating solution for hard coat layer.

| | |
|---|---|
| PET-30 | 61.6 g |
| BISCOAT 360 | 37.0 g |
| IRGACURE 127 | 3.2 g |
| FP-13 | 0.3 g |
| Cellulose acetate butyrate | 7.2 g |
| MIBK | 61.9 g |
| MEK | 28.8 g |

In the foregoing coating solution, a matrix after curing had a refractive index of 1.51.

[Preparation of Composition for Antistatic Layer]
(Preparation of Conductive Polymer Composition)

Preparation Example 1

Preparation of Aqueous Solution of Organic Conductive Polymer 8.0 g of 3,4-ethylenedioxythiophene was added to 1,000 mL of a 2% by mass aqueous solution of polystyrenesulfonic acid (molecular weight: about 100,000) (PS-5, manufactured by Tosoh Organic Chemical Co., Ltd.) and mixed at 20° C. After 100 mL of an oxidation catalyst liquid (containing 15% by mass of ammonium persulfate and 4.0% by mass of ferric sulfate) was added to this mixed liquid, the mixture was allowed to react while stirring at 20° C. for 3 hours.

After 1,000 mL of ion-exchanged water was added to the resulting reaction liquid, about 1,000 mL of the solution was removed by adopting an ultrafiltration method. This operation was repeated thrice.

100 mL of a sulfuric acid aqueous solution (10% by mass) and 1,000 mL of ion-exchanged water were added to the resulting solution, and about 1,000 mL of the solution was removed by adopting an ultrafiltration method.

After 1,000 mL of ion-exchange water was added to the resulting liquid, about 1,000 mL of the liquid was removed by adopting an ultrafiltration method. This operation was repeated five times.

There was thus obtained an about 1.1% by mass aqueous solution. A solids concentration was regulated with ion-exchanged water to form a 1.0% by mass aqueous solution. There was thus prepared a conductive polymer composition (A-1). This (A-1) is an aqueous solution, and a relative dielectric constant of water is 80.

The relative dielectric constant was measured at a measuring temperature of 20° C. and a measuring frequency of 10 kHz using a relative dielectric constant measurement device: TRS-10T Model, manufactured by Ando Electric Co., Ltd. by a transformer bridge method.

Preparation Example 2

Preparation of Water/Acetone Solution of Organic Conductive Polymer

After 200 mL of acetone was added to 200 mL of the conductive polymer composition (A-1) prepared in Preparation Example 1, 210 mL of water and acetone were removed by ultrafiltration. This operation was repeated once, and a solids concentration was regulated with acetone to form a 1.0% by mass water/acetone solution. There was thus prepared a conductive polymer composition (A-2). This solution had a water content of 15% by mass, and the water/acetone mixed solvent had a relative dielectric constant of 30.3.

Preparation Example 3

Preparation of Acetone Solution of Organic Conductive Polymer

After 500 mL of acetone having 2.0 g of trioctylamine dissolved therein was added to 200 mL of the conductive polymer composition (A-2) prepared in Preparation Example 2, the mixture was stirred by a stirrer for 3 hours. 510 mL of water and acetone were removed by ultrafiltration. A solids concentration was regulated with acetone to form a 1.0% by mass water/acetone solution. There was thus prepared a conductive polymer composition (A-3). This solution had a water content of 2% by mass, and the water/acetone mixed solvent had a relative dielectric constant of 22.7.

Preparation Example 4

Preparation of Methyl Ethyl Ketone Solution of Organic Conductive Polymer 300 mL of methyl ethyl ketone was added to 200 mL of the conductive polymer composition (A-3) prepared in Preparation Example 3 and mixed, and the mixture was concentrated under reduced pressure at room temperature to an extent that the total amount reached 200 mL. A solids concentration was regulated with methyl ethyl ketone to form a 1.0% by mass water/acetone/methyl ethyl ketone solution. There was thus prepared a conductive polymer composition (A-4). This solution had a water content of 0.05% by mass and an acetone residual ratio of not more than 1% by mass. This water/acetone/methyl ethyl ketone mixed solvent had a relative dielectric constant of 15.5.

Preparation Example 5

Preparation of Isopropyl Alcohol Solution of Organic Conductive Polymer

After 500 mL of isopropyl alcohol having 0.8 g of tripropylamine dissolved therein was added to 200 mL of the conductive polymer composition (A-2) prepared in Preparation Example 2, the mixture was stirred by a stirrer for 3 hours. 510 mL of water, acetone and isopropyl alcohol were removed by ultrafiltration. A solids concentration was regulated with isopropyl alcohol to form a 1.0% by mass water/acetone/isopropyl alcohol solution. There was thus prepared a conductive polymer composition (A-5). This solution had a water content of 1.8% by mass. This water/acetone/isopropyl alcohol solution had a relative dielectric constant of 22.8.

Preparation Example 6

Preparation of Ethyl Alcohol Solution of Organic Conductive Polymer (Synthesis of Aniline Polymer)
10 parts by mass of aniline was added dropwise to 100 parts by mass of 1.2 moles/liter of a hydrochloric acid aqueous solution while stirring, and the mixture was cooled to 10° C. An aqueous solution prepared by dissolving 28 parts by mass of ammonium persulfate in 28 parts by mass of ion-exchanged water in advance was added dropwise to this solution over 4 hours. After completion of the dropwise addition, this mixed solution was further stirred at 10° C. for 4 hours. A deposited green precipitate was filtered and washed with ion-exchanged water until a color of the filtrate vanished. Furthermore, the thus obtained precipitates were gathered; the gathered precipitate was dispersed in an ammonia aqueous solution; and the dispersion was filtered at 25° C. for 2 hours and washed with ion-exchanged water until a color of the filtrate varnished, followed by drying to obtain an aniline polymer.

(Preparation of Polyanion Dopant)

25 parts by mass (20% by mole relative to the whole of monomer components) of 2-acrylamide-methylpropanesulfonic acid, 15 parts by mass (15% by mass relative to the whole of monomer components) of a (methoxy polyethylene glycol methyl methacrylate) macromonomer having a methacryloyl group at one terminal thereof (NK ESTER M-230G, manufactured by Shin-Nakamura Chemical Co., Ltd.), 65 parts by mass of styrene (65% by mole relative to the whole of monomer components) and 3 parts by mass of azoisobutyronitrile as a polymerization initiator were dissolved in a mixed aqueous solution of 20 parts by mass of ion-exchanged water and 130 parts by mass of ethyl alcohol as a solvent, thereby preparing a monomer mixture. Subsequently, the thus prepared monomer mixture was charged in a separable flask equipped with a stirring blade, an inert gas inlet tube, a reflux condenser, a thermometer and a dropping funnel and subjected to a polymerization reaction at 75° C. for 4 hours. Subsequently, 1 part by mass of azoisobutyronitrile was added to this solution, and the mixture was subjected to polymerization ripening at 75° C. for 4 hours, followed by cooling to 30° C. There was thus prepared a sulfate group-containing polyanion dopant having 40% of a non-volatile matter content.

(Doping of Polyanion Dopant on Aniline Polymer)

Subsequently, 5 parts by mass of the foregoing polymer of aniline, 125 parts by mass of the foregoing polyanion dopant and 370 parts by mass of water were charged, respectively, and the respective components were harmonized with each other. The mixture was dispersed in a discharge amount of 0.5 litters/min at a peripheral speed of 10 m/sec for one hour using a "flow-type sand grinder mill (UVM-2)" (manufactured by Aimex Co., Ltd.) with zirconia beans (0.5 mm in diameter). A temperature at the time of dispersion was regulated to 75° C. There was thus obtained an aniline polymer composition having a concentration of 11%.

(Displacement of Solvent)

Subsequently, after 200 mL of ethyl alcohol to 20 mL of the foregoing aniline polymer composition, 100 mL of water and ethyl alcohol were removed by ultrafiltration. 200 mL of ethyl alcohol was added to 120 mL of the remaining composition, and 100 mL of water and ethyl alcohol were removed by ultrafiltration. This operation was repeated twice. A solids concentration was regulated with ethyl alcohol to form a 1.0% by mass water/ethyl alcohol solution. There was thus prepared a conductive polymer composition (A-6). This solution had a water content of 1% by mass, and the mixed solvent had a dielectric constant of 26.2.

Preparation Example 7

Preparation of Comparative Conductive Polymer Solution

3-Dodecyloxythiophene was electrochemically polymerized in acetonitrile in the copresence of tetraethylammonium tetrafluoroborate according to the procedures in Example 4 of EP-B-0328981, thereby synthesizing a comparative conductive polymer in which a monoanion dopant was incorporated into a polythiophene derivative. This polythiophene derivative was dissolved in a mixed solution of tetrahydrofuran and butyl acetate in a mass ratio of 9/1 such that its amount was 1% by mass. There was thus prepared an organic conductive polymer solution (A-7). This mixed solvent had a dielectric constant of 7.25.

(Preparation of Inorganic Fine Particle Dispersion)
(Preparation of Dispersion (B-1))

After 20 parts by mass of acryloyloxypropyltrimethoxysilane and 1.5 parts by mass of diisopropoxyaluminum ethyl acetate were added to 500 parts by mass of a silica sol (silica, MEK-ST-L, average particle size: 45 nm, solids concentration: 30%, manufactured by Nissan Chemical Industries, Ltd.) and mixed, 9 parts by mass of ion-exchanged water was added. After the mixture was allowed to react at 60° C. for 8 hours, the reaction mixture was cooled to room temperature, to which was then added 1.8 parts by mass of acetylacetone. Finally, a solids concentration was regulated to 20% by mass, thereby preparing a dispersion (B-1).

(Preparation of Dispersion (B-2))

A dispersion (B-2) was prepared in the same manner as in the foregoing dispersion (B-1), except that a silica sol (silica, MEK-ST, average particle size: 15 nm, solids concentration: 30%, manufactured by Nissan Chemical Industries, Ltd.) was used in place of the silica sol used in the dispersion (B-1).

(Preparation of Dispersion (B-3))

A silica fine particle having a cavity in the inside thereof was prepared by changing the condition at the time of preparation in Preparation Example 4 of JP-A-2002-79616. This was subjected to solvent displacement with methanol from the water dispersion state. Finally, a solids concentration was regulated to 20% by mass, thereby obtaining a particle having an average particle size of 45 nm, a shell thickness of about 7 nm and a refractive index of the silica particle of 1.30. This is designated as a dispersion (B).

After 15 parts by mass of acryloyloxypropyltrimethoxysilane and 1.5 parts by mass of diisopropoxyaluminum ethyl acetate were added to 500 parts by mass of the foregoing dispersion (B) and mixed, 9 parts by mass of ion-exchanged water was added. After the mixture was allowed to react at 60° C. for 8 hours, the reaction mixture was cooled to room temperature, to which was then 1.8 parts by mass of acetylacetone. Furthermore, the solvent was replaced by distillation under reduced pressure while adding MEK such that the total liquid amount was substantially constant, and finally, a solids concentration was regulated to 20% by mass, thereby preparing a dispersion (B-3).

(Preparation of Organic Fine Particle (D-1))

25 parts by mass of methyl methacrylate and 5 parts by mass of phenyl methacrylate as a monofunctional (meth) acrylic monomer, 10 parts by mass of ethylene glycol dimethacrylate as a polyfunctional (meth)acrylic monomer and 5 parts by mass of styrene were mixed and stirred to prepare a monomer solution for polymerization.

On the other hand, 4 parts by mass of potassium persulfate as a water-soluble initiator, 2 parts by mass of sodium dodecylbenzenesulfonate as a water-soluble emulsifier and 2 parts by mass of cetyl alcohol as an emulsification aid were added to 400 parts by mass of ion-exchanged water, thereby preparing a mixed aqueous solution.

After the whole of the resulting monomer solution for polymerization was added to the mixed aqueous solution, the mixture was subjected to forced emulsification for 60 minutes by an ultrasonic homogenizer, thereby preparing a dispersion in which polymerizable droplets having an average particle size of 50 nm were dispersed. Subsequently, after the resulting dispersion was collectively thrown into a nitrogen-purged 20 L-volume polymerizer equipped with a stirrer, a jacket, a reflux condenser and a thermometer, a temperature of the polymerizer was raised to 80° C., thereby starting the polymerization. The polymerization was carried out for 4 hours, and the reaction mixture was ripened for one hour, followed by cooling the polymerizer to room temperature. The resulting slurry was dialyzed using a cellulose membrane having a fractional molecular weight of 10,000; the remaining cetyl alcohol, potassium persulfate or sodium dodecylbenzenesulfonate was removed; and filtration was further performed to remove coagulated particles and insoluble matters. The resulting resin fine particle was dried in vacuo to obtain an organic fine particle (D-1). The resulting particle had a refractive index of 1.52.

(Preparation of Organic Fine Particle (D-2))

70 parts by mass of hexafluoroisopropyl methacrylate as a fluorine based monomer and 10 parts by mass of ethylene glycol dimethacrylate were mixed and stirred to prepare a monomer solution for polymerization.

On the other hand, 2 parts by mass of potassium persulfate as a water-soluble initiator and 2 parts by mass of cetyl alcohol which is a water-soluble emulsifier and also an emulsification aid were added to 400 parts by mass of ion-exchanged water as a polar solvent, thereby preparing a mixed aqueous solution.

After the whole of the resulting monomer solution for polymerization was added to the mixed aqueous solution, the mixture was subjected to forced emulsification for 60 minutes by an ultrasonic homogenizer, thereby preparing a dispersion in which polymerizable droplets having an average particle size of 50 nm were dispersed. Subsequently, after the resulting dispersion was collectively thrown into a nitrogen-purged 20 L-volume polymerizer equipped with a stirrer, a jacket, a reflux condenser and a thermometer, a temperature of the polymerizer was raised to 80° C., thereby starting the polymerization. The polymerization was carried out for 4 hours, and the reaction mixture was ripened for one hour, followed by cooling the polymerizer to room temperature. The resulting slurry was dialyzed using a cellulose membrane having a fractional molecular weight of 10,000; the remaining cetyl alcohol or potassium persulfate was removed; and filtration was further performed to remove coagulated particles and insoluble matters. The resulting resin fine particle was dried in vacuo to obtain an organic fine particle (D-2).

(Preparation of Organic Fine Particle (D-3))

70 parts by mass of hexafluoroisopropyl methacrylate as a fluorine based monomer, 10 parts by mass of ethylene glycol dimethacrylate and 20 parts by mass of hexane as a non-polymerizable compound were mixed and stirred to prepare a monomer solution for polymerization.

On the other hand, 2 parts by mass of potassium persulfate as a water-soluble initiator and 2 parts by mass of cetyl alcohol which is a water-soluble emulsifier and also an emulsification aid were added to 400 parts by mass of ion-exchanged water as a polar solvent, thereby preparing a mixed aqueous solution.

After the whole of the resulting monomer solution for polymerization was added to the mixed aqueous solution, the mixture was subjected to forced emulsification for 60 minutes by an ultrasonic homogenizer, thereby preparing a dispersion in which polymerizable droplets having an average particle size of 50 nm were dispersed. Subsequently, after the resulting dispersion was collectively thrown into a nitrogen-purged 20 L-volume polymerizer equipped with a stirrer, a jacket, a reflux condenser and a thermometer, a temperature of the polymerizer was raised to 80° C., thereby starting the polymerization. The polymerization was carried out for 4 hours, and the reaction mixture was ripened for one hour, followed by cooling the polymerizer to room temperature. The resulting slurry was dialyzed using a cellulose membrane having a fractional molecular weight of 10,000; the remaining cetyl alcohol or potassium persulfate was removed; and filtration was further performed to remove coagulated particles and insoluble matters. The resulting resin fine particle was dried in vacuo to obtain an organic hollow fine particle (D-3).

7.1 g of DPHA, 15.6 g of the inorganic fine particle dispersion (B-1), 187.5 g of the conductive polymer composition (A-4), 0.4 g of a polymerization initiator (IRGACURE 127 (a trade name), manufactured by Ciba Japan K.K.) and a dilution solvent of methyl ethyl ketone and propylene glycol monomethyl ether acetate in a mass ratio of 1/1 were added and stirred to form a composition having a solids content of 4% by mass. This composition was filtered through a polypropylene-made filter having a pore size of 5 μm, thereby preparing a coating solution Ln-1 for antistatic layer.

Also, coating solutions Ln-2 to Ln-25 for antistatic layer were prepared in the same manner by mixing the respective components in a composition shown in Table 1. In Table 1, a parenthesis expressed after each of the components represents a ratio (% by mass) of a solids content of the component relative to the whole of solids of the coating solution.

Example 1

[Preparation of Optical Laminate]
(Application of Antiglare Layer)

An 80 μm-thick triacetyl cellulose film (TAC-TD80U, manufactured by Fujifilm Corporation) was wound out in a rolled form; the foregoing coating solution for antiglare layer was coated thereon under a condition at a conveying rate of 30 m/min by a die coating process using a slot die disclosed in Example 1 of JP-A-2006-122889 and dried at 60° C. for 150 seconds; and thereafter, the coating layer was cured upon irradiation with ultraviolet rays having a radiation illuminance of 400 mW/cm$^2$ and an irradiation dose of 100 mJ/cm$^2$ by using an air-cooled metal halide lamp (manufactured by Eyegraphics Co., Ltd.) of 160 W/cm in an oxygen concentration of about 0.1% under purging with nitrogen, followed by winding up. The coating amount was regulated such that the thickness of each of the antiglare layers was 14 μm. The surface of the antiglare layer had irregularities and had a surface roughness Ra of 0.13 μM and an average spacing of irregularities Sm of the surface of 85 μM in conformity with JIS B0601.

(Application of Antistatic Layer)

The triacetyl cellulose film having the foregoing antiglare layer applied thereon was again wound out; each of the foregoing coating solutions Ln-1 to Ln-25 for antistatic layer was coated thereon under a condition at a conveying rate of 30 m/min in the foregoing die coating process using a slot die and dried at 90° C. for 75 seconds; and thereafter, the coating layer was irradiated with ultraviolet rays having a radiation illuminance of 400 mW/cm$^2$ and an irradiation dose of 240 mJ/cm$^2$ by using an air-cooled metal halide lamp (manufactured by Eyegraphics Co., Ltd.) of 240 W/cm in an oxygen concentration of from 0.01 to 0.1% under purging with nitrogen, thereby forming an antistatic layer having a thickness of 100 nm, followed by winding up. There were thus prepared optical laminate samples 101 to 125.

The respective compounds which were used are as follows.
PET-30: Mixture of pentaerythritol triacrylate and pentaerythritol tetraacrylate [manufactured by Nippon Kayaku Co., Ltd.]

BISCOAT 360: Trimethylolpropane EO-added triacrylate [manufactured by Osaka Organic Chemical Industry Ltd.]

DPHA: Mixture of dipentaerythritol pentaacrylate and dipentaerythritol hexaacrylate [manufactured by Nippon Kayaku Co., Ltd.]

P-12: Fluorine-containing copolymer which is Illustrative Compound (P-12) disclosed in JP-A-2007-293325 and which is a fluorine-containing copolymer containing silicone in a main chain thereof and having a hydroxyl group and an acryloyl group as a polymerizable functional group in a side chain thereof, number average molecular weight: 30,000, Mw/Mn=1.6

PETA: Mixture of pentaerythritol triacrylate and pentaerythritol tetraacrylate [manufactured by Nippon Kayaku Co., Ltd.]

IRGACURE 127: Polymerization initiator [manufactured by Ciba Japan K.K.]

FP-13: Fluorine based surfactant (used after being dissolved in a solids concentration of 40% by mass in an MEK solvent)

FP-13

$$-(CH_2-C(CH_3))_{60}-$$
$$O=C-O-(CH_2)_2-(CF_2)_6-H$$

$$-(CH_2-CH)_{40}-$$
$$O=C-O-t\text{-}Bu$$

M.W. 14000

(Saponification Treatment of Optical Laminate)

Each of the thus obtained optical laminates was subjected to a saponification treatment.

Alkaline bath: 1.5 moles/dm$^3$ of sodium hydroxide aqueous solution at 55° C. for 120 seconds First water washing bath: Tap water for 60 seconds Neutralization bath: 0.05 moles/dm$^3$ of sulfuric acid of at 30° C. for 20 seconds Second water washing bath: Tap water for 60 seconds Drying: 120° C., 60 seconds (Evaluation of Optical Laminate)

Each of the thus obtained saponified optical laminates was evaluated in the following manners.

(Evaluation 1) Evaluation of Surface Resistivity:

A surface resistivity SR (Ω/sq) was measured under the following condition.

Evaluation circumstance condition: 25° C., 60% RH

Device: High resistance meter, 4339B, manufactured by Agilent Technologies

After the measurement, a common logarithm log (SR) of the surface resistivity SR was calculated, and the evaluation was made according to the following criteria. The smaller the log (SR), the smaller the surface resistance and the more excellent the conductivity is, and the conductivity with "b rank" or more is required for the practical use.

A: The log (SR) is not more than 9.

B: The log (SR) is more than 9 and not more than 11.

b: The log (SR) is more than 11 and not more than 13.

c: The log (SR) is more than 13.

(Evaluation 2) Scar Resistance by Steel Wool (SW Scar Resistance):

A rubbing test was carried out using a rubbing tester under the following condition.

Evaluation circumstance condition: 25° C., 60% RH

Rubbing material: Steel wool (manufactured by Nippon Steel Wool Co., Ltd., Grade No 0000) was wound around a tip part (1 cm×1 cm) of the tester coming into contact with the sample and fixed by a band.

Movement distance (one way): 13 cm

Rubbing rate: 13 cm/sec

Load: 500 g/cm$^2$

Contact area of tip part: 1 cm×1 cm

Number of rubbing: 10 reciprocations

An oily black ink was applied on the back surface of the rubbed sample, and a scar of the rubbed portion was visually observed by reflected light and evaluated according to the following criteria. A level with "B rank" or more is required for the practical use.

A: Even by very careful observation, a scar is not observed at all.

B: A weak scar is observed.

C: A scar is observed at the first glance.

(Evaluation 3) Evaluation of Scar Resistance by Eraser:

A rubbing test was carried out using a rubbing tester under the following condition.

Evaluation circumstance condition: 25° C., 60% RH

Rubbing material: A plastic eraser (MONO, manufactured by Tombow Pencil Co., Ltd.) was fixed in a tip part (1 cm×1 cm) of the tester coming into contact with a sample.

Movement distance (one way): 4 cm

Rubbing rate: 2 cm/sec

Load: 250 g/cm$^2$

Contact area of tip part: 1 cm×1 cm

Number of rubbing: 50 reciprocations

An oily black ink was applied on the back surface of the rubbed sample, and a scar of the rubbed portion was visually observed by reflected light and evaluated according to the following criteria. A level with "B rank" or more is required for the practical use.

A: Even by very careful observation, a scar is not observed at all.

B: A weak scar is observed.

C: A scar is observed at the first glance.

(Evaluation 4) Whitening:

An oily black ink was applied on the back surface of a sample, and whitening of the antistatic layer was visually observed by reflected light and evaluated according to the following criteria. A level with "B rank" or more is required for the practical use.

A: Even by very careful observation, whitening is not observed at all.

B: According to very careful observation, whitening is slightly observed.

C: Whitening can be viewed at the first glance.

(Evaluation 5) Uniformity in Surface Properties:

An oily black ink was applied on the back surface of a sample, and uniformity in surface properties of the antistatic layer was visually observed by reflected light and evaluated according to the following criteria. A level with "B rank" or more is required for the practical use.

A: Even by very careful observation, unevenness in the surface properties is not observed at all.

B: According to very careful observation, unevenness is slightly observed.

C: Unevenness can be viewed at the first glance.

(Evaluation 6) Reflectance:

The back surface of a sample was roughed with a sheet of sandpaper and then treated a black ink, thereby making it free from reflection of the back surface. In this state, an integrated spectral reflectance of the front surface side was measured at an incident angle of 5° in a wavelength region of from 380 to 780 nm using a spectrophotometer (manufactured by JASCO Corporation). An arithmetic average value of an integrated reflectance at from 450 to 650 nm was employed for the result.

The evaluation results are shown in Tables 1 to 3. In the tables, CAB represents cellulose acetate butyrate (molecular weight: 50,000); and PMMA represents polymethyl methacrylate (molecular weight: 100,000).

TABLE 1

| Optical Laminate | Remark | Coating solution for antistatic layer | Composition of coating solution | | | |
|---|---|---|---|---|---|---|
| | | | Conductive polymer composition | Inorganic fine particle dispersion | | |
| | | | | Dispersion | Particle shape and the like | Surface treatment of particle (*) |
| Sample 101 | Example | Ln-1 | A-4 (15) | B-1 (25) | Solid & large | Yes |
| Sample 102 | Comparison | Ln-2 | A-7 (15) | B-1 (25) | Solid & large | Yes |
| Sample 103 | Comparison | Ln-3 | — | B-1 (25) | Solid & large | Yes |
| Sample 104 | Comparison | Ln-4 | A-4 (15) | — | — | — |
| Sample 105 | Comparison | Ln-5 | A-4 (15) | — | — | — |
| Sample 106 | Example | Ln-6 | A-4 (15) | B-2 (25) | Solid & small | Yes |
| Sample 107 | Example | Ln-7 | A-4 (15) | B-1 (6), B-2 (19) | Solid & large and small | Yes |
| Sample 108 | Example | Ln-8 | A-4 (15) | B-3 (25) | Hollow | Yes |
| Sample 109 | Example | Ln-9 | A-4 (15) | B-1 (6), B-2 (19) | Solid & large and small | Yes |
| Sample 110 | Example | Ln-10 | A-4 (15) | B-1 (25) | Solid & large | Yes |
| Sample 111 | Example | Ln-11 | A-3 (15) | B-1 (6), B-2 (19) | Solid & large and small | Yes |
| Sample 112 | Example | Ln-12 | A-5 (15) | B-1 (6), B-2 (19) | Solid & large and small | Yes |
| Sample 113 | Example | Ln-13 | A-6 (15) | B-1 (6), B-2 (19) | Solid & large and small | Yes |
| Sample 114 | Example | Ln-14 | A-4 (15) | MEK-ST-L (6), MEK-ST (19) | Solid & large and small | No |
| Sample 115 | Example | Ln-15 | A-4 (15) | B (25) | Hollow | No |
| Sample 116 | Comparison | Ln-16 | — | B-2 (25) | Solid & small | Yes |
| Sample 117 | Comparison | Ln-17 | — | B-1 (6), B-2 (19) | Solid & large and small | Yes |
| Sample 118 | Comparison | Ln-18 | — | B-3 (25) | Hollow | Yes |
| Sample 119 | Example | Ln-19 | A-4 (1) | B-1 (6), B-2 (19) | Solid & large and small | Yes |
| Sample 120 | Example | Ln-20 | A-4 (5) | B-1 (6), B-2 (19) | Solid & large and small | Yes |
| Sample 121 | Example | Ln-21 | A-4 (30) | B-1 (6), B-2 (19) | Solid & large and small | Yes |
| Sample 122 | Example | Ln-22 | A-4 (50) | B-1 (6), B-2 (19) | Solid & large and small | Yes |
| Sample 123 | Example | Ln-23 | A-4 (60) | B-1 (6), B-2 (19) | Solid & large and small | Yes |
| Sample 124 | Comparison | Ln-24 | A-1 (15) | B-1 (6), B-2 (19) | Solid & large and small | Yes |

TABLE 1-continued

| Sample | | | | | | |
|---|---|---|---|---|---|---|
| Sample 125 | Comparison | Ln-25 | A-2 (15) | B-1 (6), B-2 (19) | Solid & large and small | Yes |
| Sample 101N (**) | Example | Ln-1 | A-4 (15) | B-1 (25) | Solid & large | Yes |
| Sample 102N (**) | Comparison | Ln-2 | A-7 (15) | B-1 (25) | Solid & large | Yes |
| Sample 103N (**) | Comparison | Ln-3 | — | B-1 (25) | Solid & large | Yes |

| | Composition of coating solution | | | Evaluation results | | | | |
|---|---|---|---|---|---|---|---|---|
| Optical laminate | Ionizing radiation curable compound | Polymerization initiator | Others | log (SR) | SW scar resistance | Scar resistance by eraser | Whitening | Uniformity in surface properties |
| Sample 101 | DPHA (57) | IRGACURE 127 (3) | — | A | A | A | B | A |
| Sample 102 | DPHA (57) | IRGACURE 127 (3) | — | C | A | A | B | A |
| Sample 103 | DPHA (71) | IRGACURE 127 (4) | — | C | A | A | B | A |
| Sample 104 | DPHA (81) | IRGACURE 127 (4) | — | b | B | B | A | C |
| Sample 105 | DPHA (78) | IRGACURE 127 (4) | CAB (3) | b | B | B | B | C |
| Sample 106 | DPHA (57) | IRGACURE 127 (3) | — | A | A | B | A | A |
| Sample 107 | DPHA (57) | IRGACURE 127 (3) | — | A | A | A | A | A |
| Sample 108 | DPHA (57) | IRGACURE 127 (3) | — | A | A | A | B | A |
| Sample 109 | Fluorine-containing polymer P-12 (17) DPHA (57) | IRGACURE 127 (3) | — | A | A | A | A | A |
| Sample 110 | 2-Hydroxyethyl acrylamide (17) SPHA (40) | IRGACURE 127 (3) | — | A | A | A | B | A |
| Sample 111 | DPHA (57) | IRGACURE 127 (3) | — | A | B | A | A | A |
| Sample 112 | DPHA (57) | IRGACURE 127 (3) | — | A | B | A | A | A |
| Sample 113 | DPHA (57) | IRGACURE 127 (3) | — | B | A | A | B | A |
| Sample 114 | DPHA (57) | IRGACURE 127 (3) | — | A | B | B | A | B |
| Sample 115 | DPHA (57) | IRGACURE 127 (3) | — | A | B | B | B | B |
| Sample 116 | DPHA (71) | IRGACURE 127 (4) | — | C | A | B | A | A |
| Sample 117 | DPHA (71) | IRGACURE 127 (4) | — | C | A | A | A | A |
| Sample 118 | DPHA (71) | IRGACURE 127 (4) | — | C | A | A | B | A |
| Sample 119 | DPHA (57) | IRGACURE 127 (3) | — | b | A | A | A | A |
| Sample 120 | DPHA (57) | IRGACURE 127 (3) | — | B | A | A | A | A |
| Sample 121 | DPHA (57) | IRGACURE 127 (3) | — | A | A | A | A | A |
| Sample 122 | DPHA (57) | IRGACURE 127 (3) | — | A | B | B | A | B |
| Sample 123 | DPHA (57) | IRGACURE 127 (3) | — | A | C | C | A | C |
| Sample 124 | DPHA (57) | IRGACURE 127 (3) | — | The evaluation is impossible because of non-mixing. | | | | |
| Sample 125 | DPHA (57) | IRGACURE 127 (3) | — | C | C | C | C | C |
| Sample 101N (**) | DPHA (57) | IRGACURE 127 (3) | — | A | A | A | B | A |
| Sample 102N (**) | DPHA (57) | IRGACURE 127 (3) | — | B | A | A | B | A |
| Sample 103N (**) | DPHA (71) | IRGACURE 127 (4) | — | C | A | A | B | A |

(*) As to the surface treatment of the inorganic fine particle, the presence or absence of the treatment with the polymerizable unsaturated group-containing compound is described.
(**) The samples 101N to 103N are a non-saponified sample.

In Table 1, the evaluation results regarding the samples 101N to 103N which were not subjected to a saponification treatment are also shown.

From the results of Table 1, in comparison with the sample in which a fine particle is not used jointly, it is understood that in the sample using a fine particle, an optical laminate which is lowered in the log (SR) and simultaneously improved in the uniformity of coating film surface properties and which is excellent in scar resistance and whitening is obtained (compare the samples 101 and 104).

Also, in the samples containing a hydrophobilized conductive polymer composition containing the polymer dopant of the invention, the saponification resistance is high, and a lowering of the antistatic ability to be caused due to the saponification treatment is not observed (compare the samples 101 and 101N). On the other hand, even when the conductive polymer composition is contained, in the optical laminate using a monomer for the dopant, the antistatic properties are lowered after the saponification (compare the samples 102 and 102N); and in the comparative optical laminate not containing the conductive polymer composition, it does not originally exhibit antistatic properties.

For the purpose of increasing the viscosity of the coating composition to make the coating film surface properties uniform, in the case of using CAB as a polymer in the antistatic layer, the affinity with the conductive polymer was insufficient so that the uniformity in surface properties could not be improved (see the sample 105). Also, in the case of using the non-hydrophobilized conductive polymer composition, the affinity of the coating composition is low, and the scar resistance and uniformity in surface properties are greatly deteriorated (see the samples 124 and 125).

Example 2

[Preparation of Optical Laminate]
(Application of Antiglare Layer 2)

An 80 μm-thick triacetyl cellulose film (TAC-TD80U, manufactured by Fujifilm Corporation) was wound out in a rolled form; the foregoing coating solution for antiglare layer was coated thereon under a condition at a conveying rate of 30 m/min by a die coating process using a slot die disclosed in Example 1 of JP-A-2006-122889 and dried at 60° C. for 150 seconds; and thereafter, the coating layer was cured upon irradiation with ultraviolet rays having a radiation illuminance of 400 mW/cm$^2$ and an irradiation dose of 100 mJ/cm$^2$ by using an air-cooled metal halide lamp (manufactured by Eyegraphics Co., Ltd.) of 160 W/cm in an oxygen concentration of about 0.1% under purging with nitrogen, followed by winding up. The coating amount was regulated such that the thickness of each of the antiglare layers was 8 μm. The surface of the antiglare layer had irregularities and had a surface roughness Ra of 0.25 μm and an average spacing of irregularities Sm of the surface of 55 μm in conformity with JIS B0601 (1994).

(Application of Hard Coat Layer)

A hard coat layer was applied in the same manner, except that in the foregoing application of the antiglare layer, the coating solution for antiglare layer was changed to the foregoing coating solution for hard coat layer. The surface of the antiglare layer was small in irregularities and had a surface roughness Ra of 0.03 μm and an average spacing of irregularities Sm of the surface of 120 μm in conformity with JIS B0601 (1994).

The coating solution was applied on the thus obtained antiglare layer 2 or hard coat layer by changing the kind of the coating solution and the thickness as shown in Table 2, thereby obtaining samples 201 to 208. The evaluation results regarding these samples are also shown in Table 2.

TABLE 2

| Optical laminate | Remark | Layer configuration | Coating solution for antistatic layer | Thickness of antistatic layer (μm) | log (SR) | SW scar resistance | Scar resistance by eraser | Whitening | Uniformity in surface properties |
|---|---|---|---|---|---|---|---|---|---|
| Sample 201 | Comparison | Support/antiglare layer/antistatic layer | Ln-1 | 0.02 | C | C | C | C | C |
| Sample 202 | Example | Support/antiglare layer/antistatic layer | Ln-1 | 0.03 | B | B | B | B | B |
| Sample 203 | Example | Support/antiglare layer/antistatic layer | Ln-1 | 0.10 | A | B | B | B | A |
| Sample 204 | Example | Support/antiglare layer/antistatic layer | Ln-1 | 0.40 | A | B | A | A | A |
| Sample 205 | Comparison | Support/antiglare layer/antistatic layer | Ln-1 | 0.60 | A | A | A | C | B |
| Sample 206 | Example | Support/hard coat layer/antistatic layer | Ln-1 | 0.10 | A | A | A | A | A |
| Sample 207 | Comparison | Support/antiglare layer/antistatic layer | Ln-4 | 0.10 | b | C | C | A | C |
| Sample 208 | Comparison | Support/hard coat layer/antistatic layer | Ln-4 | 0.10 | b | B | B | A | B |

From the results of Table 2, the samples of the Examples of the invention are an optical laminate excellent from the viewpoints of antistatic properties, scar resistance, whitening and uniformity in surface properties. When the thickness of the antistatic layer is less than 0.03 μm, repellence occurs; uniform coating cannot be achieved; and the resulting optical laminate is insufficient from the viewpoints of antistatic properties, scar resistance and whitening. When the thickness of the antistatic layer exceeds 0.40 μm, the whitening is greatly deteriorated.

Also, the comparative optical laminate not containing the inorganic fine particle is inferior in the uniformity in surface properties; and in particular, on the antiglare surface, in comparison with the case of a hard coat layer having a gently surface, repellence occurs, and the scar resistance is greatly inferior (compare the samples 207 and 208).

Example 3

Coating solutions Ln-26 to Ln-32 for antistatic layer in which respective components were mixed in a composition shown in Table 3 were prepared. Each of optical laminates was prepared by applying an antistatic layer in a thickness of 0.1 μm on the antiglare layer prepared in Example 1 according to the procedures as in Example 1. Results obtained by the evaluation according to the procedures as in Example 1 are shown in Table 3.

TABLE 3

| Optical laminate | Remark | Coating solution | Conductive polymer composition | Fine particle dispersion Dispersion | Inorganic/ organic | Particle shape and the like | Ionizing radiation curable compound |
|---|---|---|---|---|---|---|---|
| Sample 301 | Example | Ln-26 | A-15 (15) | B (25) | Inorganic | Hollow & large | DPHA (57) |
| Sample 302 | Example | Ln-27 | A-15 (15) | D-1 (25) | Organic | Solid & large | DPHA (57) |
| Sample 303 | Example | Ln-28 | A-15 (15) | D-2 (25) | Organic | Solid & large | DPHA (57) |
| Sample 304 | Example | Ln-29 | A-15 (15) | D-3 (25) | Organic | Hollow & large | DPHA (57) |
| Sample 305 | Example | Ln-30 | A-15 (15) | D-3 (25) | Organic | hollow & large | PETA (57) |
| Sample 306 | Comparison | Ln-31 | A-15 (15) | — | — | — | DPHA (81) |
| Sample 307 | Comparison | Ln-32 | A-15 (15) | — | — | — | DPHA (76) |
| Sample 301N (*) | Example | Ln-26 | A-15 (15) | B (25) | Inorganic | Hollow & large | DPHA (57) |
| Sample 302N (*) | Example | Ln-27 | A-15 (15) | D-1 (25) | Organic | Solid & large | DPHA (57) |
| Sample 303N (*) | Example | Ln-28 | A-15 (15) | D-2 (25) | Organic | Solid & large | DPHA (57) |
| Sample 304N (*) | Example | Ln-29 | A-15 (15) | D-3 (25) | Organic | Hollow & large | DPHA (57) |
| Sample 305N (*) | Example | Ln-30 | A-15 (15) | D-3 (25) | Organic | hollow & large | PETA (57) |
| Sample 306N (*) | Comparison | Ln-31 | A-15 (15) | — | — | — | DPHA (81) |
| Sample 307N (*) | Comparison | Ln-32 | A-15 (15) | — | — | — | DPHA (76) |

| Optical laminate | Polymerization initiator | Others | log (SR) | SW scar resistance | Scar resistance by eraser | Whitening | Uniformity in surface properties | Reflectance (%) |
|---|---|---|---|---|---|---|---|---|
| Sample 301 | IRGACURE 127 (3) | — | A | B | B | B | B | 3.2 |
| Sample 302 | IRGACURE 127 (3) | — | A | A | A | A | A | 4.5 |
| Sample 303 | IRGACURE 127 (3) | — | A | A | A | B | B | 3.2 |
| Sample 304 | IRGACURE 127 (3) | — | A | A | A | B | B | 2.7 |
| Sample 305 | IRGACURE 127 (3) | — | A | A | B | B | B | 3.2 |
| Sample 306 | IRGACURE 127 (4) | — | b | B | B | A | C | 4.5 |
| Sample 307 | IRGACURE 127 (4) | PMMA (5) | C | C | B | C | C | 4.5 |
| Sample 301N (*) | IRGACURE 127 (3) | — | A | A | B | B | B | 3.2 |
| Sample 302N (*) | IRGACURE 127 (3) | — | A | A | A | A | A | 4.5 |
| Sample 303N (*) | IRGACURE 127 (3) | — | A | A | A | B | B | 3.2 |
| Sample 304N (*) | IRGACURE 127 (3) | — | A | A | A | B | B | 2.7 |
| Sample 305N (*) | IRGACURE 127 (3) | — | A | A | B | B | B | 3.2 |

TABLE 3-continued

| Sample | | | | | | | | | |
|---|---|---|---|---|---|---|---|---|---|
| Sample 306N (*) | IRGACURE 127 (4) | — | b | B | B | A | C | 4.5 |
| Sample 307N (*) | IRGACURE 127 (4) | PMMA (5) | C | C | B | C | C | 4.5 |

(*) The samples 301N to 307N are a non-saponified sample.

From the results of Table 3, in comparison with the sample in which a fine particle is not used, it is understood that in the sample using a fine particle, the log (SR) is lowered, and simultaneously, the uniformity of coating film surface properties are improved. Also, in the case of using an organic fine particle, it is understood that the SW scar resistance of the sample does not change before and after the saponification and that excellent saponification resistance is revealed.

Also, in the organic fine particle, it is understood that in the particle containing a component having an aromatic group, a difference in refractive index from a conductive polymer is reduced; that unnecessary scattering within the coating film is reduced; and that the whitening is greatly improved (see the sample 302).

Furthermore, in the case of using an organic hollow particle, when a compound having a molecular weight exceeding 450 is used as the ionizing radiation curable compound, the reflectance is lowered, whereas when a compound having a low molecular weight is used, the lowering of the reflectance loses comparable to a solid particle, and it may be estimated that voids in the inside of the particle varnished (compare the samples 303 to 305).

[Evaluation on Liquid Crystal Display Device]
(Preparation of Polarizing Plate)

The both surfaces of a polarizer which had been prepared by adsorbing iodine onto polyvinyl alcohol and stretched were adhered to and protected by an 80 μm-thick triacetyl cellulose film (TAC-TD80U, manufactured by Fujifilm Corporation) which had been dipped in an NaOH aqueous solution of 1.5 moles/L at 55° C. for 2 minutes, neutralized and then washed with water and each of the films of the saponified samples 101 to 125, 201 to 208 and 301 to 307 of the optical laminate, thereby preparing a polarizing plate.

(Preparation of Liquid Crystal Display Device)

A polarizing plate and a retardation film provided in a VA mode liquid crystal display device (LC-37GS10, manufactured by Sharp Corporation) were peeled off, and instead, each of the above-prepared polarizing plates was stuck such that its transmission axis was coincident with that of the polarizing plate stuck onto the product, thereby preparing a liquid crystal display device having an optical laminate. The polarizing plate was stuck such that optical laminate faced the viewing side.

With respect to the thus prepared polarizing plate and image display device, similar to the respective stuck optical laminates, the Examples exhibited excellent surface properties, antistatic properties and scratch resistance without causing whitening, streaks and unevenness as compared with the Comparative Examples. Also, in the Examples, a liquid crystal display device which is extremely small in reflection of the background, very high in display grade and excellent in antifouling properties was obtained.

What is claimed is:

1. An optical laminate comprising a support and an antistatic layer formed from a composition comprising the following (A) to (C) and having an average thickness of from 0.03 to 0.40 μm:
   (A) a hydrophobilized conductive polymer composition comprising a polythiophene π-conjugated system conductive polymer and an anion group-containing polymer dopant;
   (B) a silica particle having an average particle size of from 1 to 300 nm; and
   (C) an ionizing radiation curable compound,
   wherein the antistatic layer is an outermost layer,
   wherein a total content of the polythiophene n-conjugated system conductive polymer and the anion group-containing polymer dopant in the composition for forming the antistatic layer is 1 to 37% by mass based on a total solid content of the composition, and
   wherein an antiglare layer having irregularities on at least one surface thereof is present between the support and the antistatic layer, and the antiglare layer comprises a transparent resin and a light diffusible particle.

2. The optical laminate according to claim 1, wherein the silica particle (B) is surface-treated with at least one of a hydrolyzate of an organosilane compound represented by the following formula (1) and a partial condensate of the hydrolyzate:

$$(R^1)_{a1}—Si(X^1)_{4-a1} \qquad (1)$$

wherein $R^1$ represents a substituted or unsubstituted alkyl group or a substituted or unsubstituted aryl group; $X^1$ represents a hydroxyl group or a hydrolyzable group; a1 represents an integer of from 1 to 3; and when plural $R^1$s or $X^1$s are present, each $R^1$ or $X^1$ may be the same as or different from every other $R^1$ or $X^1$.

3. The optical laminate according to claim 1, wherein the conductive polymer composition (A) is soluble in an organic solvent having a relative dielectric constant of from 2 to 30 and a water content of not more than 5% by mass in a degree of at least 1.0% by mass.

4. The optical laminate according to claim 1, wherein the silica particle (B) comprises a silica particle having an average particle size of from 40 to 300 nm.

5. The optical laminate according to claim 4, wherein the silica particle (B) further comprises a silica particle having an average particle size of from 1 to 40 nm.

6. The optical laminate according to claim 1, wherein the silica particle (B) has pores in an inside thereof.

7. The optical laminate according to claim 1, wherein the ionizing radiation curable compound (C) has a polymerizable unsaturated group.

8. The optical laminate according to claim 7, wherein the ionizing radiation curable compound (C) has a (meth)acryloyl group.

9. The optical laminate according to claim 1, wherein the ionizing radiation curable compound (C) comprises a photocurable fluorine-containing polymer.

10. The optical laminate according to claim 9, wherein the photocurable fluorine-containing polymer is a copolymer comprising a structural unit derived from a fluorine-containing vinyl monomer and a structural unit having a (meth)acryloyl group in a side chain thereof.

11. The optical laminate according to claim 10, wherein the copolymer is represented by the following formula (5):

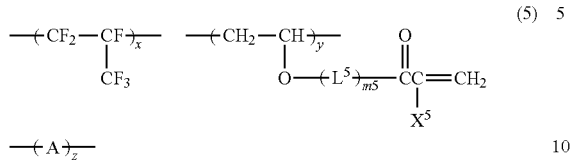

wherein $L^5$ represents a connecting group having from 1 to 10 carbon atoms; m5 represents 0 or 1; $X^5$ represents a hydrogen atom or a methyl group; A represents an arbitrary polymerization unit and may be constituted of a single component or plural components; and each of x, y and z represents mole % of a respective constituent component and represents a value satisfied with relations of $30 \leq x \leq 60$, $5 \leq y \leq 70$ and $0 \leq z \leq 65$, respectively.

12. The optical laminate according to claim 1, wherein the antistatic layer comprises an antifouling agent.

13. The optical laminate according to claim 1, wherein an average particle size of the light diffusible particle of the antiglare layer is from 5.5 to 15 μm, and an average thickness of the antiglare layer is from 8 to 40 μm.

14. The optical laminate according to claim 1, wherein a refractive index of the antistatic layer is lower than a refractive index of the antiglare layer.

15. The optical laminate according to claim 1, wherein a degree of polymerization of the anion group-containing polymer dopant is that a monomer unit number is from 10 to 100,000.

16. The optical laminate according to claim 1, wherein a content of the anion group-containing polymer dopant is from 0.1 to 10 moles per 1 mole of the π-conjugated system conductive polymer.

17. The optical laminate according to claim 1, wherein the hydrophobilized conductive polymer composition is formed by esterification or etherification of the anion group of the polymer dopant.

18. The optical laminate according to claim 1, wherein a total content of the silica particle is 10 to 40% by mass based on a total solid content of the antistatic layer.

19. A polarizing plate comprising two protective films and a polarizing film provided between the two protective films, wherein at least one of the protective films is an optical laminate comprising a support and an antistatic layer formed from a composition comprising the following (A) to (C) and having an average thickness of from 0.03 to 0.40 μm:
(A) a hydrophobilized conductive polymer composition comprising a polythiophene π-conjugated system conductive polymer and an anion group-containing polymer dopant;
(B) a silica particle having an average particle size of from 1 to 300 nm; and
(C) an ionizing radiation curable compound,
wherein the antistatic layer is an outermost layer of the optical laminate,
wherein a total content of the polythiophene π-conjugated system conductive polymer and the anion group-containing polymer dopant in the composition for forming the antistatic layer is 1 to 37% by mass based on a total solid content of the composition, and
wherein an antiglare layer having irregularities on at least one surface thereof is present between the support and the antistatic layer, and the antiglare layer comprises a transparent resin and a light diffusible particle.

20. A polarizing plate comprising two protective films and a polarizing film provided between the two protective films, wherein one of the protective films is an optical laminate comprising a support and an antistatic layer formed from a composition comprising the following (A) to (C) and having an average thickness of from 0.03 to 0.40 μm:
(A) a hydrophobilized conductive polymer composition comprising a polythiophene π-conjugated system conductive polymer and an anion group-containing polymer dopant;
(B) a silica particle having an average particle size of from 1 to 300 nm; and
(C) an ionizing radiation curable compound,
and the other protective film is an optical compensation film having optical anisotropy,
wherein the antistatic layer is an outermost layer of the optical laminate,
wherein a total content of the polythiophene π-conjugated system conductive polymer and the anion group-containing polymer dopant in the composition for forming the antistatic layer is 1 to 37% by mass based on a total solid content of the composition, and
wherein an antiglare layer having irregularities on at least one surface thereof is present between the support and the antistatic layer. and the antiglare layer comprises a transparent resin and a light diffusible particle.

* * * * *